United States Patent
Einola et al.

(10) Patent No.: US 6,438,370 B1
(45) Date of Patent: *Aug. 20, 2002

(54) LOCATION UPDATE METHOD AND INTER CORE NETWORK ENTITY HANDOVER METHOD

(75) Inventors: Heikki Einola; Jaakko Rajaniemi, both of Helsinki (FI); Khiem Le, Coppell, TX (US)

(73) Assignee: Nokia Telecommunications, Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,191

(22) Filed: Mar. 17, 1999

Related U.S. Application Data

(63) Continuation-in-part of application No. 09/098,216, filed on Jun. 16, 1998, now abandoned.

(51) Int. Cl.[7] .................................................. H04Q 7/20
(52) U.S. Cl. ........................ 455/422; 455/456; 455/436; 455/432
(58) Field of Search ................................ 455/432, 435, 455/456, 450, 67.3, 67.6, 426, 442, 422, 436, 67.1; 370/310, 277

(56) References Cited

U.S. PATENT DOCUMENTS

| | | | | |
|---|---|---|---|---|
| 5,361,396 A | * | 11/1994 | Onoe et al. ................. | 455/435 |
| 5,442,682 A | * | 8/1995 | Svedin et al. ............... | 455/435 |
| 5,475,689 A | * | 12/1995 | Kay et al. .................... | 455/435 |
| 5,619,552 A | * | 4/1997 | Karppanen et al. ......... | 455/435 |
| 5,754,537 A | * | 5/1998 | Jamal .......................... | 455/67.3 |
| 5,828,659 A | * | 10/1998 | Teder et al. ................. | 455/67.3 |
| 5,832,381 A | * | 11/1998 | Kauppi ........................ | 455/432 |
| 5,884,177 A | * | 3/1999 | Hanley ........................ | 455/442 |
| 5,933,777 A | * | 8/1999 | Rahman ...................... | 455/450 |
| 5,978,368 A | * | 11/1999 | Hjelm et al. ................. | 455/450 |
| 6,002,933 A | * | 12/1999 | Bender et al. ............... | 455/442 |

FOREIGN PATENT DOCUMENTS

| | | |
|---|---|---|
| EP | 0 520 433 A | 12/1992 |
| WO | WO 95 28063 A | 10/1995 |

OTHER PUBLICATIONS

Cullen, J. M. et al., "The Universal Mobile Telecommunications System —A Mobile Network for the 21$^{st}$ Century," BT Technology Journal, vol. 14, No. 3, Jul. 1, 1996, pp. 123–131, XP 000598162.

Berruto, E., "Research Activities on UMTS Radio Interface, Network Architectures, and Planning," IEEE Communications Magazine, vol. 36, No. 2, Feb. 1, 1998, pp. 82–95, XP 000740416.

* cited by examiner

Primary Examiner—Doris H. To
(74) Attorney, Agent, or Firm—Altera Law Group, LLC

(57) ABSTRACT

A scheme for providing a notification to a Mobile Station (MS) to initiate a location update in a mobile telecommunication system, a scheme for providing update of location of the MS to a new Core Network (CN) entity via interface between the CN entities, a scheme for providing update of location of the MS to a new CN entity via interface between a CN entity and a Serving RNC (SRNC), a scheme for providing an inter Core Network (CN) handover, e.g. inter-SGSN handover, in a mobile telecommunication system, are disclosed.

21 Claims, 18 Drawing Sheets

LOCATION UPDATE METHOD AND INTER CORE NETWORK ENTITY HANDOVER METHOD

This is a continuation-in-part of application Ser. No. 09/098,216, filed Jun. 16, 1998, now abandoned, which application is incorporated herein by reference.

BACKGROUND OF THE INVENTION

1. Field of the Invention

This invention relates in general to a cellular communication system, and more particularly to a location update method and an inter Core Network (CN) entity handover method, and further more particularly to a location update method and an inter-SGSN handover method in a $3^{rd}$ Generation (3G) cellular system.

2. Description of Related Art

Cellular systems have had a direct effect on the lives of millions over the past few years. For the first time, people are able to make and receive phone calls without being tied to a specific location. Mobile phones, as part of the cellular systems, have allowed people to break the tie between location and access to communication. Mobile phones have also allowed people to reach another who is in move. With the development in cellular systems, people are allowed to reach another who is mobile in anywhere at anytime.

The first generation of mobile communication systems were born in the early 1980s. The marriage of radio and telephone technologies gave birth to mobile phones and triggered a turning point in telecommunications. Adding radio access to a telephone network meant that for the first time in history, the concept of a telephone being at a fixed point in the network was no longer valid. The benefits of being able to make and receive telephone calls anywhere had appeal to business people—the original market. In the first generation of cellular networks, analog wireless technology were used for the user connection (called the "air interface"). Every voice channel had its own narrow frequency band, using a technology called Frequency Division Multiple Access (FDMA).

However, as the demand for mobile phones grew and grew, regularly exceeding forecasts, it became obvious that the available radio spectrum would not be adequate to accommodate the expected numbers of mobile phone users. The digital technology became the solution to the problem. The answer lay in new digital wireless technologies that allow larger numbers of mobile subscribers to be supported within a given frequency allocation. Time Division Multiple Access (TDMA) technology is used in which a broader frequency channel is divided into intermittent time-slots, i.e. several calls share the same frequency channel at any one time. The digital technology also offered other important benefits. It provided better voice quality and improved security against unauthorized eavesdropping. Another technology, Code Division Multiple Access (CDMA) has also been developed subsequently to increase capacity.

The first and second generation mobile communication systems were mainly set to support voice communications, although today's mobile phones can also be used for data transfer at rates that are acceptable for relatively low-speed data applications such as sending and receiving of faxes and e-mail. However, these systems do not support high-speed data or video applications. The third generation mobile communication system is being developed to remove the bandwidth bottleneck and support a whole new range of voice, data, video, and multimedia services. For example, smart messaging is bringing Internet services to every mobile user's fingertips. As people become used to the freedom that mobile communications have provided, they will become more demanding about the information and services required to benefit their lives.

The demand by consumers all over the world for mobile communications service continues to expand at a rapid pace and will continue to do so for at least the next decade. To satisfy such demand, more and more innovative mobile telecommunications networks are being built in this growing industry.

In the $3^{rd}$ generation cellular systems, many practical techniques are being developed over the past few years. The mobile telecommunication network comprises switching functions, service logic functions, database functions, and Mobility Management (MM) functions that enable subscribers to be mobile. These are some of the functions provided by Mobile Switching Centers (MSCs) for serving Circuit Switched (CS) connections, by Visitor Location Registers (VLR) for serving CS connections, or by other network entities, for example, Serving GPRS Support Node (SGSN) for Packet Switched (PS) connections (GPRS refers to General Packet Radio System).

Generally, the database in the Core Network (CN) keeps tracks of the location of Mobile Stations (MSs). In one case, the CN comprises both entities, MSC and SGSN, to implement such database. Each of the MSs can have a CS or PS connection service from the CN by sending radio signals to its Base Station (BS). Each of the BSs is controlled by a Radio Network Controller (RNC) which connects to the CN.

When a MS with an active connection moves from one area to another, a handover (also known as handoff) procedure is performed between the BSs During a handover procedure, a CN entity can operate in two different ways: one is called anchoring, and the other is called floating. In an anchoring procedure, the control of the MS remains in the first network entity where the connection between the MS and the CN was started, whereas in a floating procedure, the control of the MS is changed along with the move of the MS. FIG. 6 shows an anchoring procedure. FIG. 7 shows a floating procedure.

One of the problems in developing a $3^{rd}$ generation cellular system is location update when a MS, e.g. with an active connection, moves from one area to another. This problem does not appear in a $2^{nd}$ generation cellular system due to the fact that the $2^{nd}$ generation cellular system does not use macro diversity and Iur-interface in the systems. In a conventional $2^{nd}$ generation cellular system, e.g. GSM (Global System for Mobile communications), only one Base Station (BS) receives radio signals from a MS. Accordingly, when a MS moves from one area to another, the MS knows which BS controls the MS so that a location update can be performed by communicating between the MS and the CN via this BS. However, in a $3^{rd}$ generation cellular system, to increase the capacity of the data transmission, a macro diversity and Iur-interface concept are introduced in the system. In particular, multiple Base Stations can receive radio signals from and to a MS, and due to the Iur-interface, the BSs are not necessarily connected to one Radio Network Controller (RNC). A Serving RNC (SRNC) informs the BS which MS is under its control and is connected to the CN entities in the CN. When a MS moves, the control to the MS may be changed from one RNC to the other RNC in a fashion that the MS may not be involved. As a result, when a MS moves from one area to another, the MS does not know when the SRNC is changed. If the MS sends a location update before the SRNC is changed, the location update may be sent to a wrong CN entity.

Another problem in a $3^{rd}$ generation cellular systems is that during an active PS connection from a SGSN, a MS may move to an area where the SGSN should be changed. For instance, when a SRNC for a MS is changed, the new SRNC is connected to the new SGSN. In a $3^{rd}$ generation cellular system, changing of a controlling SGSN needs to be executed in the CN because the MS does not know when it has entered in the new SGSN area and which RNC controls the MS due to the possible macro diversity and Iur-interface. In the existing $2^{nd}$ generation cellular system, the new SGSN has to request from the old SGSN all information after the new SGSN receives a location update from the MS. During such a SGSN handover, all the radio related entities in RNCs, BSs, MSs, etc., have to be released. Thus, it is inefficient to perform an inter-SGSN handover.

Therefore, it can be seen that there is a need for an initiation scheme for location update of a MS in a $3^{rd}$ generation cellular system. It can also be seen that there is a need for an inter-SGSN handover scheme in a $3^{rd}$ generation cellular system.

SUMMARY OF THE INVENTION

To overcome the problems in the prior art described above, and to overcome other problems that will become apparent upon reading and understanding the present specification, the present invention discloses a scheme for providing a notification to a Mobile Station (MS) to initiate a location update in a $3^{rd}$ generation system. Further, the present invention discloses a scheme for providing update of location of the MS to a new Core Network (CN) entity via interface between the CN entities. Furthermore, the present invention discloses a scheme for providing update of location of the MS to a new CN entity via interface between a CN entity and a Serving RNC (SRNC). Moreover, the present invention discloses a scheme for providing an inter Core Network (CN) handover, e.g. inter-SGSN handover, in a $3^{rd}$ generation cellular system.

In the present invention, several schemes for notifying the MS to initiate a location update from the MS to a Core Network (CN) while the MS is having an ongoing connection are disclosed. In one embodiment, the present invention provides a notification to the MS when there is a Serving Radio Network Controller (SRNC) relocation, which includes the following steps of: serving the MS by a first RNC; moving the MS from a first area to a second area wherein service in the first area is controlled by the first RNC, and service in the second area is controlled by a second RNC; serving the MS by the second RNC, so that the control of the MS is changed from the first RNC to the second RNC; determining by the second RNC whether a notification to the MS for the location update is needed based on factors such as configuration of the CN which is connected to the plurality of RNCs and/or the types of connection that the MS is having, etc.; and notifying, by the second RNC, the MS that a location update from the MS should be performed; and if the notification to the MS for the location update is determined by the second RNC to be needed, updating a location of the MS in the CN. Alternatively, the RNC does not determine whether a notification to the MS for the location update is needed. It is up to the MS to determine whether the location update should be made. In this case, the second RNC directly notifies the MS that a location update from the MS should be performed, and if the MS decides to update the location, MS sends the location update to the CN.

In an alternative embodiment, the present invention provides an update of the location of the MS from a SRNC to a new idle CN entity via an interface between the SRNC and the new idle CN entity when there is a Serving Network Controller (SRNC) relocation, which includes the following steps of: serving the MS by a first RNC; moving the MS from a first area to a second area wherein service in the first area is controlled by the first RNC, and service in the second area is controlled by a second RNC; serving the MS by the second RNC, so that the control of the MS is changed from the first RNC to the second RNC; determining by the second RNC whether the location update is needed based on factors such as configuration of the CN which is connected to the plurality of RNCs and/or the types of connection that the MS is having, etc.; and sending update of the location of the MS by the second RNC to a new idle CN entity (an idle CN entity is a CN entity which does not have an active connection for that particular MS) via an interface between the SRNC and the new CN entity. The CN entity can be a MSC/VLR (Mobile Switching Center/Visitor Location Register) or a SGSN (Serving GPRS Support Node, GPRS is General Packet Radio System). Alternatively, the CN entity determines whether the location update is needed. If the location update is needed, the RNC then sends the location update to the new CN entity via the interface between the SRNC and the new CN entity.

In an additional embodiment of the present invention, a notification to the MS can also be triggered by the CN entity (for example MSC/VLR or SGSN, etc.), i.e. the CN entity initiates ordering of a location update procedure from MS. This scheme includes the following steps of: serving the MS by a first RNC; moving the MS from a first area to a second area wherein service in the first area is controlled by the first RNC, and service in the second area is controlled by a second RNC; serving the MS by the second RNC, the plurality of RNCs being connected to the CN, so that the control of the MS is changed from the first RNC to the second RNC; determining by the CN entity whether the location update is needed base on factors such as configuration of the CN and/or the types of connection that the MS is having, etc.; notifying, by the CN entity, the MS that a location update from the MS should be performed; and updating a location of the MS in the CN. Alternatively, after receiving a notification from the CN entity, it is up to the MS to decide whether the location update should be performed.

In an additional alternative embodiment of the present invention, an update of the location of the MS from an active connection CN entity to a new idle CN entity via an interface between the active connection CN entity and the new idle CN entity when there is a Serving Radio Network Controller (SRNC) relocation. The scheme includes the following steps of: serving the MS by a first RNC; moving the MS from a first area to a second area wherein service in the first area is controlled by the first RNC, and service in the second area is controlled by a second RNC; serving the MS by the second RNC, the plurality of RNCs being connected to the CN, so that the control of the MS is changed from the first RNC to the second RNC; determining by the active connection CN entity whether the location update is needed based on factors such as configuration of the CN which is connected to the plurality of RNCs and/or the types of connection that the MS is having, etc.; and sending update of the location of the MS by the active connection CN entity to the new idle CN entity via an interface between the active connection CN entity and the new idle CN entity. The CN entity can be a MSC/VLR (Mobile Switching Center/Visitor Location Register) or a SGSN (Serving GPRS Support Node, GPRS is General Packet Radio System). Alternatively, the new idle CN entity determines whether the location update is needed. If the location update is needed, the active connection CN entity then sends the location update to the new idle CN entity via the interface between the active connection CN entity and the new idle CN entity.

In a further additional alternative embodiment of the present invention, a SRNC only moves Radio Resource (RR) control into a new RNC (i.e. a second RNC), and an old CN entity (i.e. the active CN entity before changing the RNC) remains control in the Core Network (CN), i.e. the old CN entity is still active after changing the RNC. The control in the CN is changed along with the location update from the MS. Accordingly, without updating from the MS, the old CN entity is active, and the control in the CN is anchored. In this case, the scheme for providing an update to a new CN entity includes the following steps: serving the MS by a first RNC; moving the MS from a first area to a second area, wherein service in the first area is controlled by the first RNC, and service in the second area controlled by a second RNC; a plurality of RNCs being connected to the CN so that the control of the MS is changed to from the first RNC to the second RNC; notifying the MS on the RNC change; and sending update of the location of the MS by the MS into the new and old CN entities.

In the above and many other embodiments, the Core Network entity can be a Mobile Switching Center/Visitor Location Register (MSC/VLR) which serves the Circuit Switched (CS) connections, or a Serving GPRS Support Node (SGSN) which serves the Packet Switched (PS) connections, or an Interworking Unit/SGSN (IWU/SGSN) which serves PS connections in 3G CN entity interworking with 2G CN entity. 3G stands for the $3^{rd}$ generation cellular system, and 2G stands for the $2^{nd}$ generation cellular system.

Further in one embodiment of the present invention, a CN entity receiving location update of the MS may serve both an old RNC and a new RNC. In an alternative embodiment, the old RNC and the new RNC are served by different CN entities.

The present invention also provides a mobile telecommunication system. In one embodiment, the system comprises: a Mobile Station (MS); and at least two Radio Network Controllers (RNCs), at least one of the RNCs being arranged to send a notification to the MS in a response to a RNC relocation between the at least two RNCs.

In another embodiment of the present invention, the system comprises: a Mobile Station (MS); at least two Radio Network Controllers (RNCs); and a Core Network (CN), the CN including at least one CN entity, at least one of the RNCs being arranged to send location update of the MS to the one CN entity via an interface between at least one RNC and at least one CN entity in a response to a RNC relocation between the at least two RNCs.

In an additional embodiment of the present invention, the system comprises: a Mobile Station (MS); at least two Radio Network Controllers (RNCs); and a Core Network (CN), the CN including at least one CN entity, the at least one CN entity being arranged to send a notification to the MS in a response to a RNC relocation between the at least two RNCs.

In a further embodiment of the present invention, the system comprises: a Mobile Station (MS); at least two Radio Network Controllers (RNCs); and a Core Network (CN), the CN including at least one CN entity, the at least one CN entity being arranged to send location update of the MS to a second CN entity via an interface between two CN entities in a response to a RNC relocation between the at least two RNCs.

The present invention further provides schemes for providing an inter CN entity handover, such as inter-SGSN handover, in a $3^{rd}$ generation cellular system, whereby one of the SGSNs is a 2G SGSN or 3G SGSN, and the other one of the SGSNs is a 2G SGSN or 3G SGSN. This is accomplished by firstly determining whether both of the SGSNs are 2G SGSN or 3G SGSN or whether one is 2G SGSN and the other is 3G SGSN, and secondly operating the corresponding inter-SGSN handover.

One advantage of the present invention is that it allows the location update of the MS to be sent to a correct CN entity in a $3^{rd}$ generation cellular system where there is a Serving RNC relocation.

Another advantage of the present invention is that it allows an inter CN entity handover, such as inter-SGSN handover, in a $3^{rd}$ generation cellular system whereby the radio related entities in RNCS, BSs, and MSs, etc., are maintained during the inter-SGSN handover. The new SGSN receives all information from the old SGSN while establishing the new SRNC during a RNC relocation.

Other embodiments to implement a method or procedure in accordance with the present invention may include alternative or optional additional aspects. These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the principles or scope of the present invention.

The present invention provides a notification to a Mobile Station (MS) to initiate a location update in a $3^{rd}$ generation system. Further, the present invention provides update of location of the MS to a new Core Network (CN) entity via interface between the CN entities. Furthermore, the present invention provides update of location of the MS to a new CN entity via interface between a CN entity and a Serving RNC (SRNC). Moreover, the present invention provides an inter Core Network (CN) handover, e.g. inter-SGSN handover, in a $3^{rd}$ generation cellular system.

Figure 1:
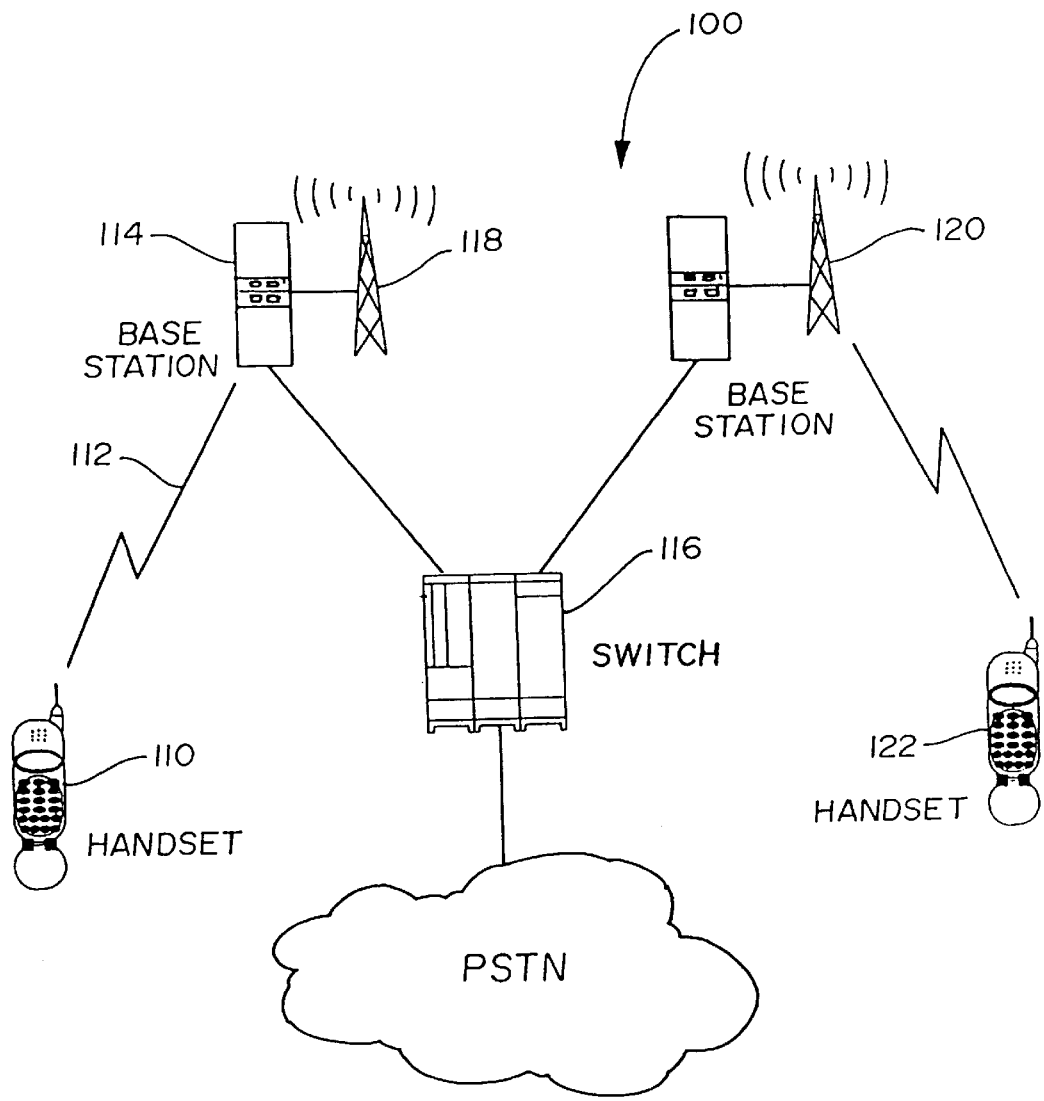
FIG. 1 illustrates a basic, generic mobile telecommunication system.

FIG. 1 illustrates a basic, generic mobile telecommunication system 100. The system 100 can be connected by blocks. The voice fed to the microphone of a handset 110 is transmitted through atmosphere media 112 to a Base Station (BS) 114. From the BS 114, a signal is routed to a network, such as Public Switched Telephone Network (PSTN), or a Packet Data Network (PDN), via a switching center 116 and or rebroadcast 118. Similarly, at the network end, voice information is transmitted from a BS 120 and received by a handset 122. Each handset 110, 112 and BS 114, 120 have a transmitter/receiver (transceiver) function commonly known to a person skilled in the art.

Figure 2:
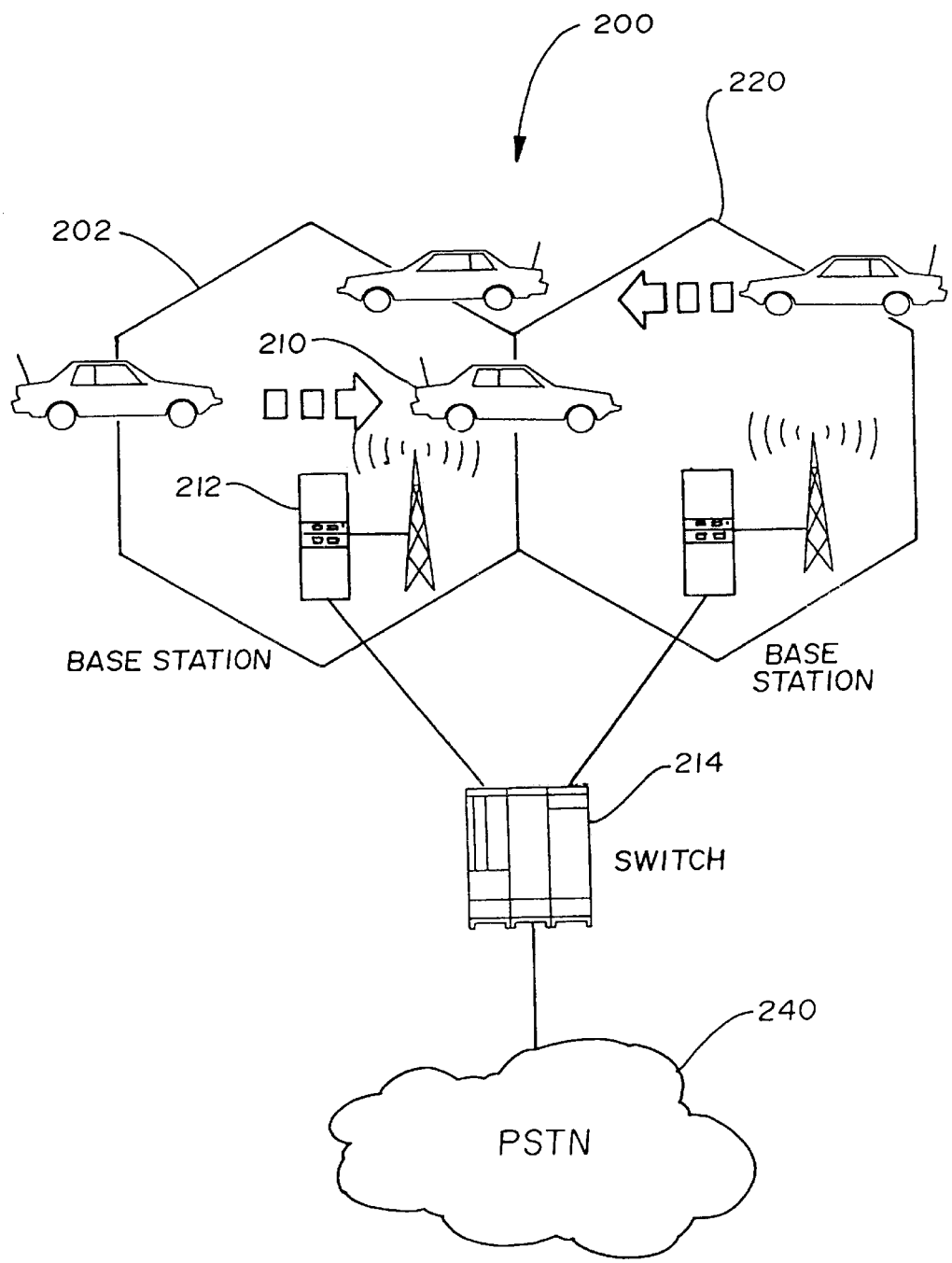
FIG. 2 illustrates a basic, generic handover process where radio signals are passed as a vehicle or mobile unit moves from one area to another.

In a $3^{rd}$ generation cellular network, multiple Base Stations (BSs) can receive radio signals from a Mobile Station. Due to macro diversity and Iur-interface, the BSs are not necessarily controlled by one Radio Network Controller (RNC). When a Mobile Station (MS) moves from one area to another, radio signals may be passed from one area to another. This pass is often called handoff or handover. FIG. 2 illustrates a simple, basic handover process 200. As a vehicle 210, a MS, moves away from BS 212, its signal strength decreases. The BS 212 monitors the signal strength within the duration of the call. When the signal strength falls below a predetermined threshold level, the network 214 asks all predetermined candidates neighboring BS 220 to report the signal strength of the mobile in the vehicle 210. If the signal strength in the neighboring cell 220 was stronger by a predetermined amount, the network 214 attempts to handover the call to the candidate neighboring cell 220. These elements are integrated to form a part of a ubiquitous coverage radio system that can connect to Public Switched Telephone Network (PSTN) 240.

Figure 3:
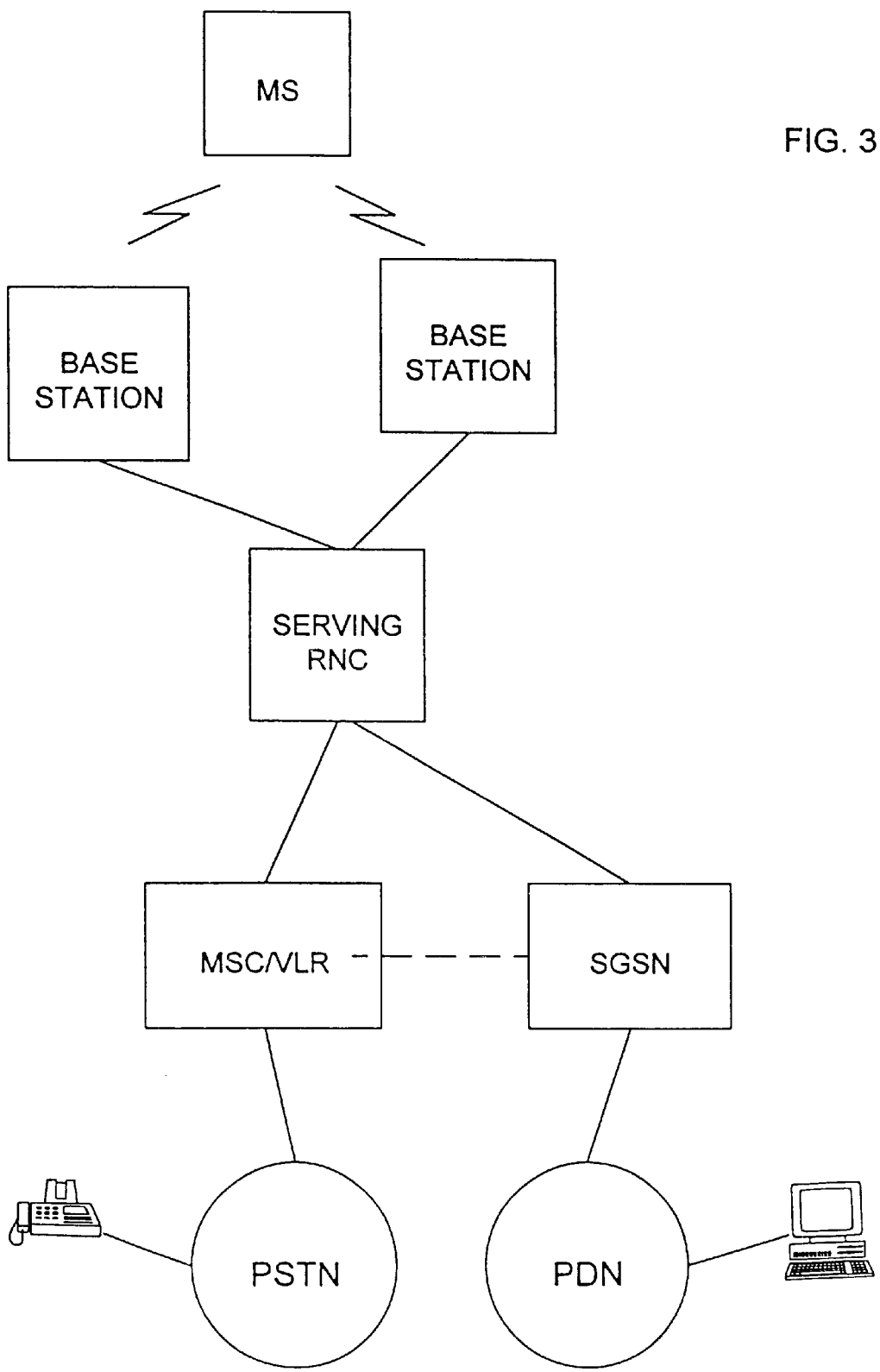
FIG. 3 illustrates a Serving RNC connected to CN entities in a $3^{rd}$ generation cellular system in accordance with the present invention.

FIG. 3 illustrates a Serving RNC (SRNC) connected to CN entities, such as MSC/VLR or a SGSN, in a $3^{rd}$ generation cellular system in accordance with the present invention. The MSC/VLR serves MS' requests for Circuit Switched (CS) connections. Accordingly, the MSC/VLR is generally communicated to a network such as PSTN, etc.. The SGSN serves MS' requests for Packet Switched (PS) connections. Accordingly, the SGSN is generally communicated to a network such as Packet Data Network (PDN), e.g. Internet Protocol (IP), etc.

Figure 4:
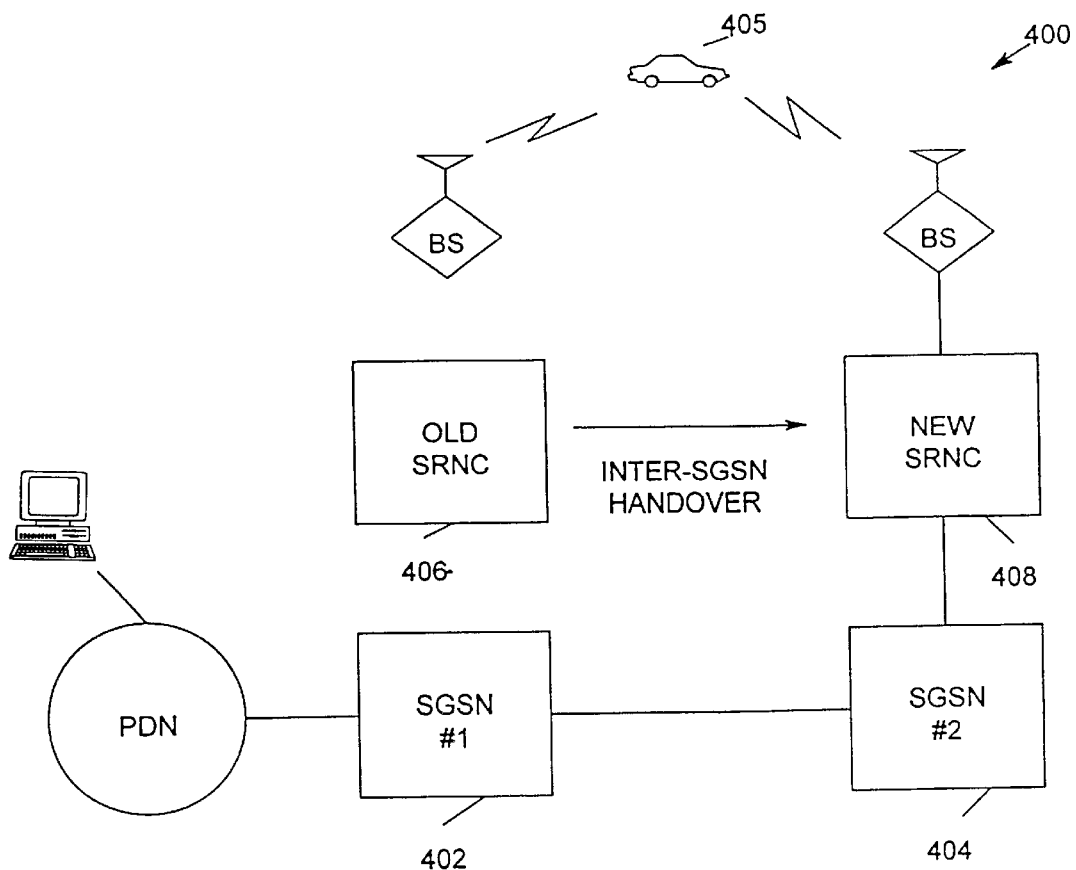
FIG. 4 illustrates an inter-SGSN handover in a mobile telecommunication system in accordance with the principles of the present invention.

FIG. 4 illustrates an inter Core Network (CN) entity handover 400, for example, inter-SGSN handover in a $3^{rd}$ generation cellular system in accordance with the present invention. Inter-SGSN handover is a handover between two SGSN network entities 402, 404 when a Mobile Station 405 moves from one area to another. The details of the inter-SGSN handover will be explained later in FIGS. 12–15. During an inter-SGSN handover, a SRNC may change from an old SRNC 406 to a new SRNC 408 as shown in FIG. 4. It is appreciated that since a SRNC can be connected to a number of SGSNs, sometimes there may not be a SRNC relocation.

Figure 5:
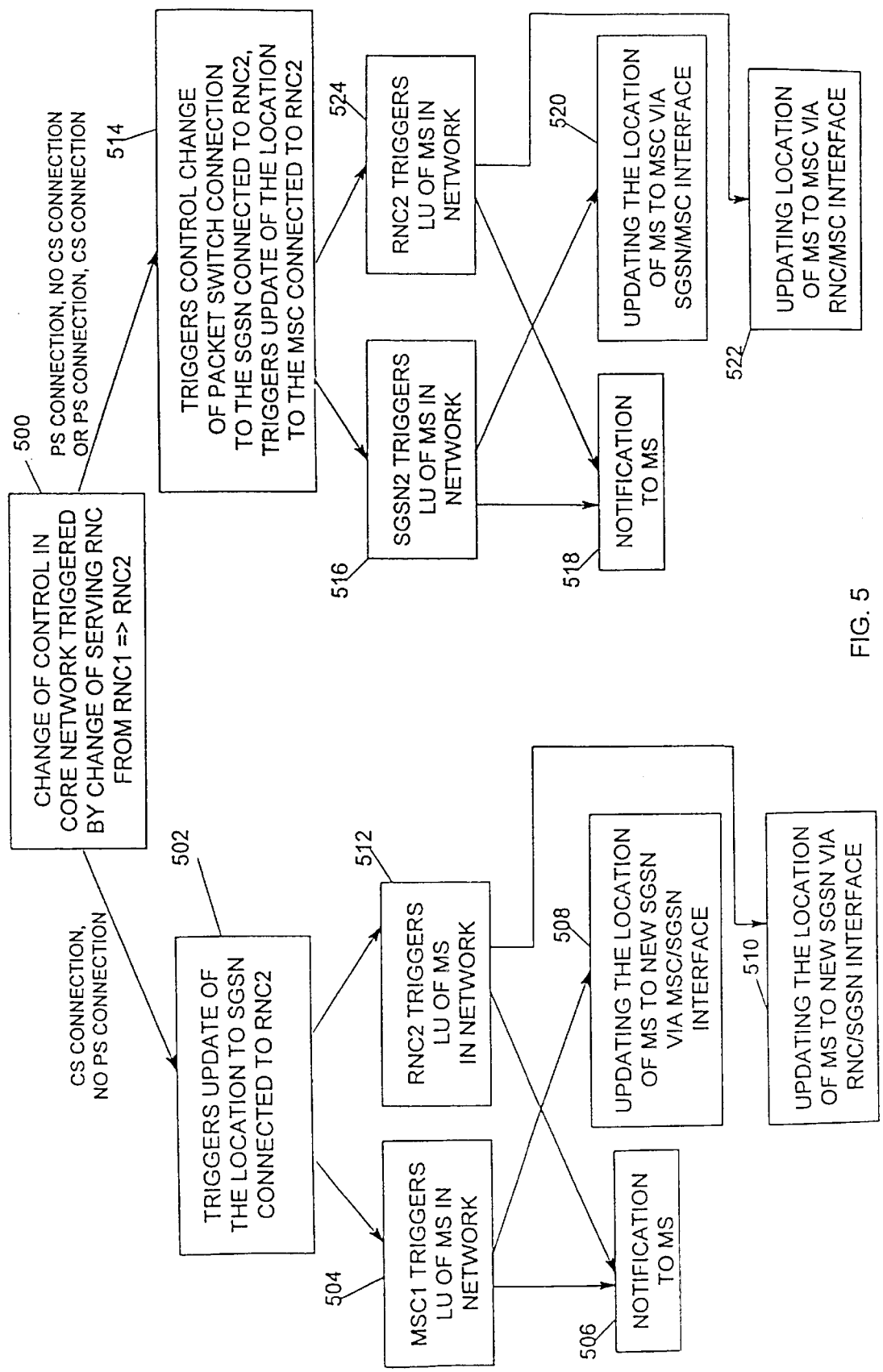
FIG. 5 illustrates a block diagram of a change of control in a Core Network (CN) triggered by a change of Serving Radio Network Controller (SRNC) (i.e. RNC relocation) in a $3^{rd}$ generation cellular system in accordance with the principles of the present invention.
Figure 6:
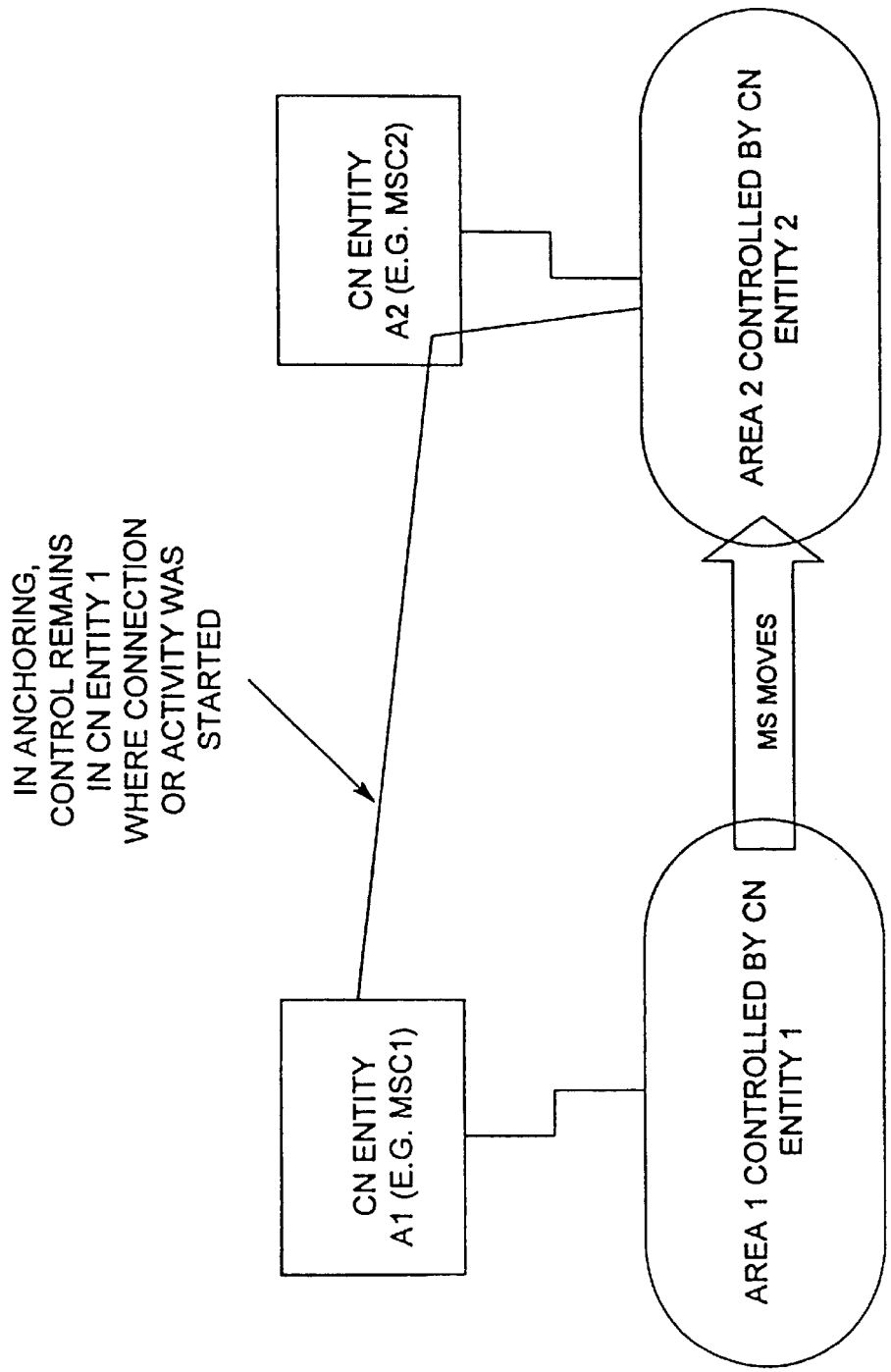
FIG. 6 illustrates an anchoring procedure when Mobile Station (MS) moves from one area to another.
Figure 7:
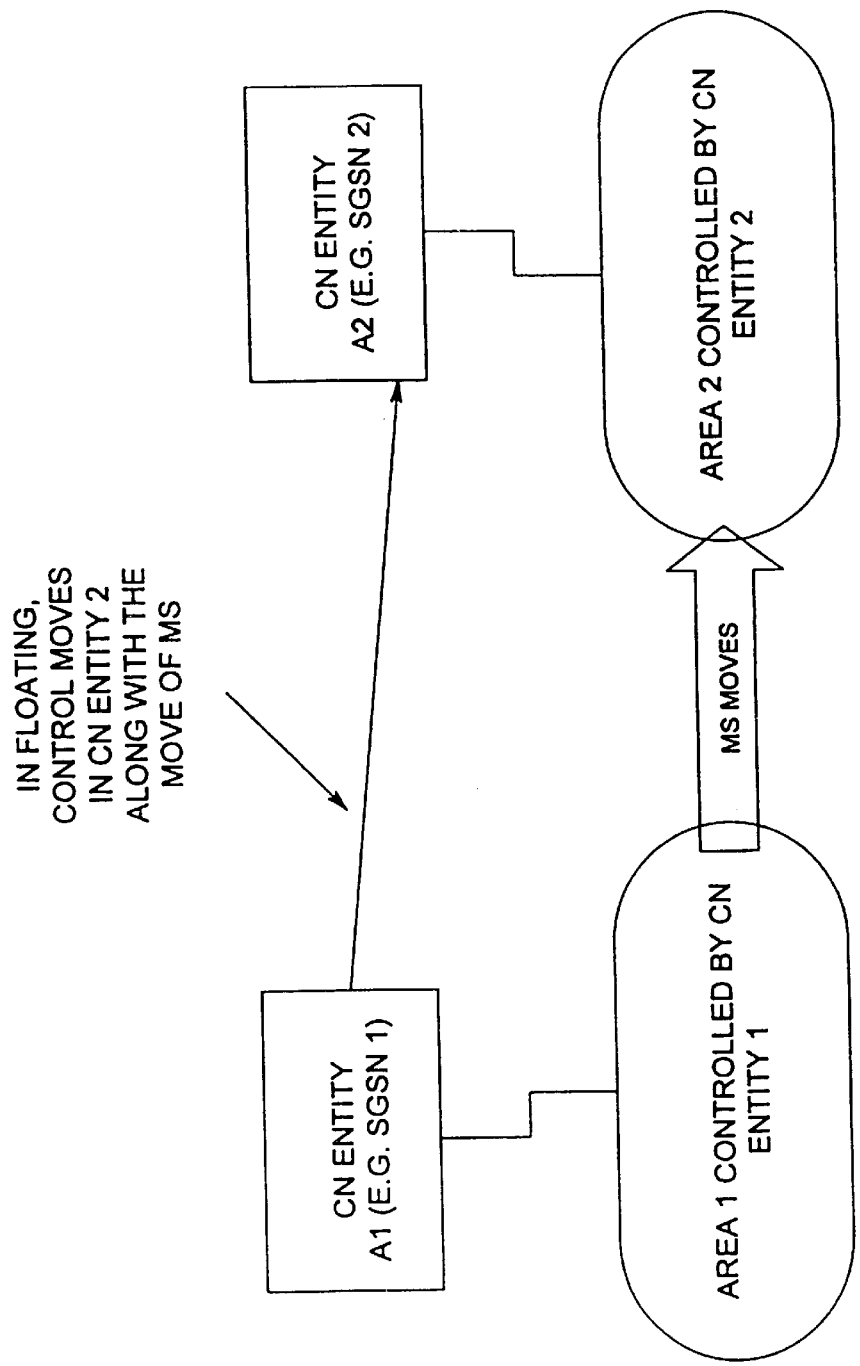
FIG. 7 illustrates a floating procedure when Mobile Station (MS) moves from one area to another.

FIG. 5 illustrates a block diagram of a change of control and Mobile Station related data in a Core Network (CN) triggered by a change of Serving Radio Network Controller (SRNC) (i.e. RNC relocation) 500 in a $3^{rd}$ generation cellular system in accordance with the principles of the present invention. There are several methods of initiating a location update of a MS. In one case, the MS has a Circuit Switched (CS) connection but not a Packet Switched (PS) connection. The change of serving RNC from RNC1 to RNC2 triggers update of the location of the MS to an idle (also called no connection) Core Network (CN) entity, such as SGSN, connected to RNC2 in box 502. There are at least four types of notification/updating the location of the MS. The first one is that the CN entity MSC1 (Mobile Switching Center) triggers location update in the network in box 504 by notifying the MS by sending the MS a message that location update should be performed, if necessary, in box 506. The second one is that the CN entity MSC1 triggers location update in the network in box 504 by updating the location of the MS to a new idle network entity, such as SGSN, via MSC/SGSN interface in box 508. The third one is that the RNC2 triggers location update of the MS in the network in box 512 by notifying the MS by sending the MS a message that location update should be performed, if necessary, in box 506. The fourth one is that the RNC2 triggers location update of the MS in the box 512 by updating the location of the MS to a new idle network entity, such as SGSN, via RNC/SGSN interface in box 510.

In a second case, the MS has a Packet Switched (PS) connection but not a Circuit Switched (CS) connection. The change of serving RNC from RNC1 to RNC2 triggers control change of the packet switch connection to the SGSN connected to the RNC2 and also may trigger update of the location of the MS to an idle Core Network (CN) entity, such as MSC, connected to RNC2 in box 514. There are at least four types of notification/updating the location of the MS. The first one is that the CN entity SGSN 2 (Serving GPRS Support Node, GPRS is referred to as General Packet Radio System) triggers location update in the network in box 516 by notifying the MS by sending the MS a message that location update should be performed, if necessary, in box 518. The second one is that the CN entity SGSN 1 triggers location update in the network in box 516 by updating the location of the MS to a new idle network entity, such as MSC, via SGSN/MSC interface in box 520. The third one is that the RNC2 triggers location update of the MS in the network in box 524 by notifying the MS by sending the MS a message that location update should be performed, if necessary, in box 518. The fourth one is that the RNC2 triggers location update of the MS in the box 524 by updating the location of the MS to a new idle network entity, such as MSC, via RNC/MSC interface in box 522.

In a third case, the MS has both a Packet Switched (PS) connection and a Circuit Switched (CS) connection as shown in FIG. 5. The location update notification and/or update procedures can be the same as in the second case described above, see from box 514 to box 522, except that it may not trigger update of the location to an idle Core Network (CN) entity, such as MSC, connected to RNC2 in box 514.

It is appreciated that whether the trigger function is performed may depend on factors such as configuration of the CN and/or the types of connection that the MS is having, etc.

Figure 16:
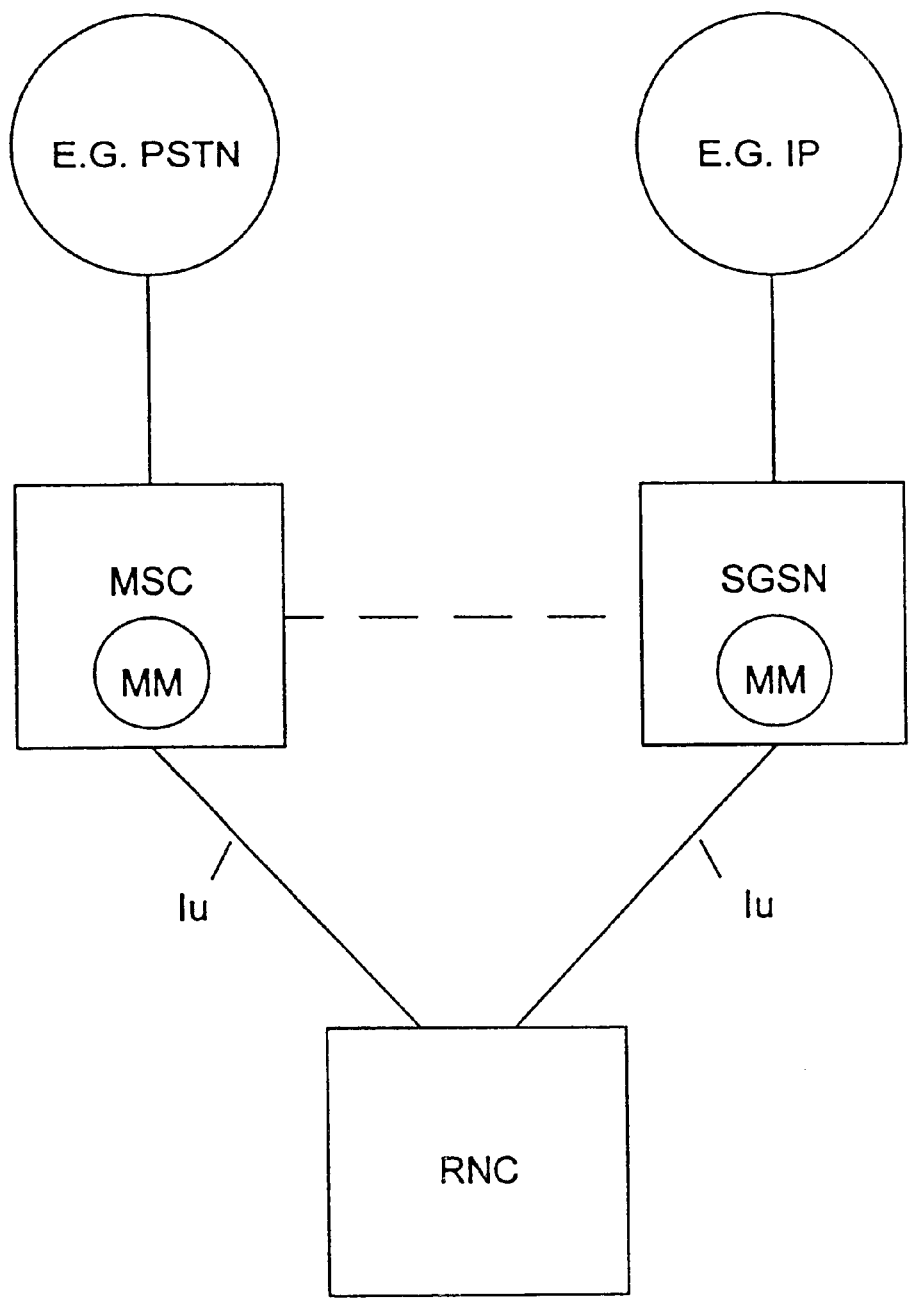
FIG. 16 illustrates a separate implementation of a Core Network (CN)
Figure 17:
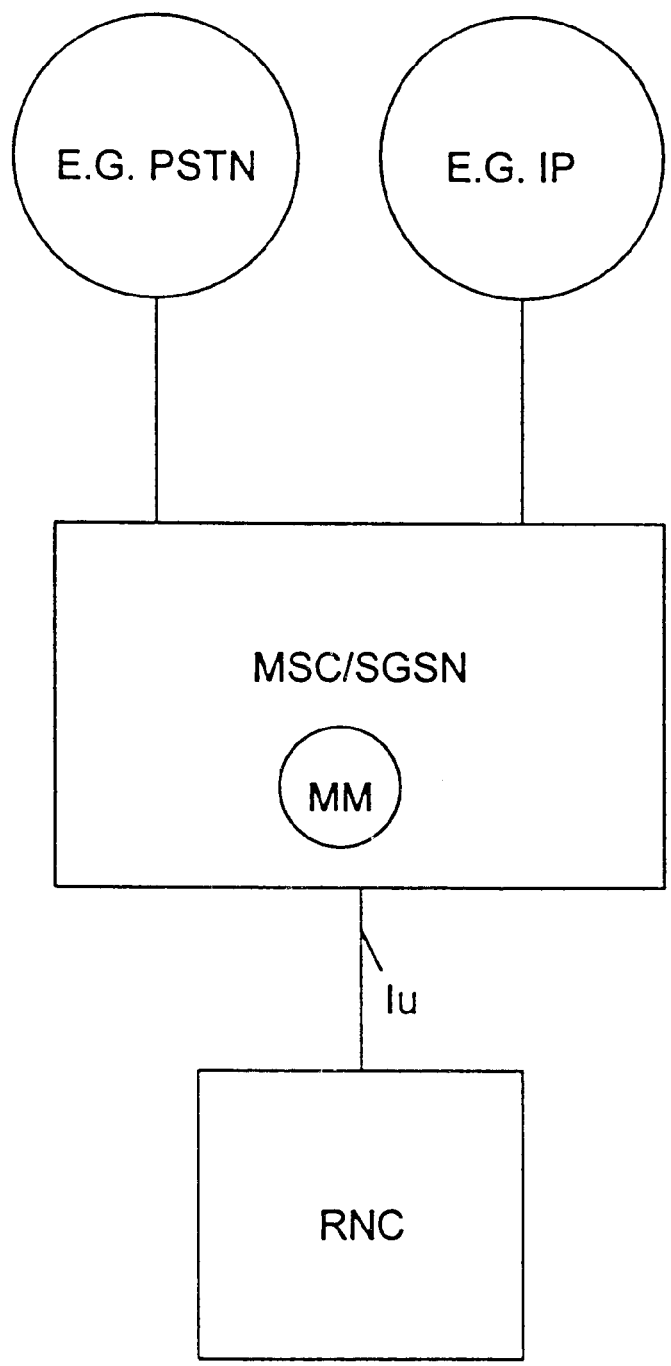
FIG. 17 illustrates an integrated implementation of a Core Network (CN)

After changing control of the SRNC, the SRNC may determine whether a location update is necessary. It is appreciated that after the MS receives a notification, the MS may also decide whether a location update should be made. The conditions for when the notification to the MS is needed may depend on the CN configuration and/or the types of connection that the MS is having, etc.. CN may have a single Mobility Management (MM) control plane or C-planes (known as an integrated implementation as shown in FIG. 17) or a number of control planes (known as a separated implementation as shown in FIG. 16). In the single C-plane CN, an anchoring operation can be performed when the SRNC is changed. In the multiple C-planes CN, a floating operation can be performed when the SRNC is changed. As a result, there is no need for notification to the MS in the CN with an integrated implementation.

FIG. 16 illustrates a separate implementation. In one embodiment, the CN entities, e.g. MSC and SGSN, are not linked. In another embodiment, the CN entities, e.g. MSC and SGSN, are linked.

FIG. 17 illustrates an integrated implementation. The CN entities, e.g. MSC and SGSN, are integrated in the implementation.

The following table shows the conditions on which SRNC's determination is based:

|  | Target RNC "1" | Target RNC "2" |
| --- | --- | --- |
| Source RNC "1" | No notify to MS | Notify to MS |
| Source RNC "2" | Notify to MS | Notify to MS |

The numbers "1" and "2" refer to the number of C-planes. For an integrated implementation, the number "1" is used; whereas for a separated implementation (here using two control planes as an example), the number "2" is used. Accordingly, the configuration of CN may affect the need for notification of MS to initiate a location update.

The SRNC may include an indicator, such as a flag, to indicate the number of Iu-links to a message that initiates RNC relocation. Once the SRNC determines to notify the MS, the notification to the MS itself contains an ID, e.g. RNC ID or location area ID, to ensure the MS to choose a correct location area for location update. The MS at the recipient end provides a chosen cell or BS to the CS MM or PS MM in the CN. The chosen cell has the same RNC ID or location area ID as that provided by the SRNC in the notification.

In the CS MM or PS MM registration procedure, i.e. MS location update procedure, the Mobility Management (MM) procedures that are allowed in various CS/PS states that the MS has, are shown in the following table:

|  | PS non-attached | PS attached | PS active |
| --- | --- | --- | --- |
| CS non-attached | CS attach or PS attach | CS attach, or PS LU, or PS detach | CS attach |
| CS attached | CS detach, or CS LU, or PS attach | CS LU, or CS detach, or PS LU, or PS detach | CS LU$^1$ or CS detach |
| CS active | PS attach | PS LU$^2$ or PS detach | None |

LU$^{1,2}$: Location update may only be performed on CN initiated notification.

In the table, PS active or CS active refers to that the MS has an ongoing a PS connection or a CS connection. CS non-attached or PS non-attached refers to that the MS is absent from the system. CS attached or PS attached refer to that the MS is seen as present by the CN, and the CN is able to reach the MS via paging. Also, the MS will perform location updates when necessary in CS/PS attached state.

When there is a change of Serving RNC (SRNC), a RNC relocation procedure is performed. Also, when a notification to the MS is initiated by the CN, the SRNC provides in a RNC-relocation procedure together with other parameters the number of the Iu-links, which are to be relocated in the RNC-relocation procedure. The network entity, e.g. MSC/VLR, SGSN (also known as PDAN, Packet Data Access Node), or IWU/SGSN (Interworking SGSN), decides a notification that it is going to send to the MS based on the following table:

|  | MSC/VLR | SGSN or IWU/SGSN |
| --- | --- | --- |
| 1 Iu-link | If PS attached, order PS-LU | If CS attached, order CS-LU |
| 2 Iu-link | — | — |

$^{1,2}$refer to the number of active Iu-links for a Mobile Station.

The CN MM, e.g. CS MM or PS MM, can then request location updates (LUs) e.g. by sending a MM information message to the MS. The MM information message may indicate the LU type, e.g. PS-LU or CS-LU, which the MS can perform. This location update procedure enables service from the new network entities when the MS has a connection in the 3$^{rd}$ generation cellular system.

As mentioned above, a handover operation between the RNCs is accomplished in an SRNC relocation procedure.

The following discussion on a SRNC-relocation procedure can be used in the present invention.

Generally, a handover procedure includes a serving RNC relocation procedure, a hard handover procedure, and a releasing resource procedure after a successful SRNC relocation. A SRNC relocation procedure is used to move URAN Core Network (URAN—Universal Mobile Telecommunication System (UMTS) Radio Access Network) connection point at RAN (Radio Access Network) side from one RNC to another. In the procedure, macrodiversity combination points of a user plane are handled by a URAN control plane connection, and the Iu links are relocated. An initial condition for the SRNC relocation procedure may be that all the branches or most of the branches used for the corresponding MS are controlled by the target RNC.

The SRNC relocation procedure is initiated by the SRNC. The procedure is initiated by sending a RANMAP (Radio Access Network Mobile Application Part) message "RELOCATION REQUIRED". The RELOCATION REQUIRED message generally contains a target RNC identity (RNC ID), a relocation/hard handover indicator, and a URAN information field. The URAN information field is a transparent field for the Core Network (CN) that is to be forwarded to a target RNC. Relocation/Hard handover indicator indicates whether this message is used to initiate a SRNC relocation or a hard handover procedure.

When the "RELOCATION REQUIRED" message is received at a network entity, e.g. MSC or SGSN, part of RANMAP activities are suspended. Having suspended RANMAP, the MSC or SGSN sends a "RELOCATION REQUEST" message to the target RNC. The "RELOCATION REQUEST" message generally contains a URAN information field, a relocation/hard handover indicator, and binding identifiers for Iu-Iinks to be established.

Then, the SRNC performs admission control procedures for the new MS in which the SRNC establishes all necessary protocol entities and sets the established protocol entities into initial states. The SRNC then prepares for switching all the Iu-links connections from the old Iu-links to the new intra RNC connection. When all intra RNC procedures are executed and when the new Iu-links are established by the MSC or SGSN, the SRNC acknowledges its readiness for the SRNC relocation by sending a "RELOCATION PROCEEDING" message to the MSC or SGSN. The "RELOCATION PROCEEDING" message indicates to the MSC or SGSN the required switching mode for each Iu link.

After the reception of the "RELOCATION PROCEEDING" message, the MSC or SGSN checks from the received message which Iu-links should be connected to a data duplication mode. The MSC or SGSN then establishes multipoint to point connections for all uplink Iu-links by connecting corresponding old and new Iu-links into the same link entity. Similarly, the MSC or SGSN starts duplicating data from the old Iu-links to the corresponding new links. When all indicated Iu-links are connected, the MSC or SGSN sends a "RELOCATION PROCEEDING" message to the target RNC.

When the SRNC receives the "RELOCATION PROCEEDING" message, the SRNC relocation procedure is executed. First, the target RNC finds feasible time instance for the execution and at the moment the target RNC starts to act as a SRNC. At that time point, the SRNC starts downlink data transmission to the Base Stations (BSs) and all Uplink (UL) links are switched from the Iur to the new corresponding Iu-links. After completion of the relocation procedure, the SRNC completes the procedure by sending a "RELOCATION COMPLETE" message to the MSC or SGSN.

When the MSC or SGSN receives the "RELOCATION COMPLETE" message, the MSC or SGSN executes Iu-link release procedures for old Iu-links, which in turn causes execution of releasing corresponding Iur connections by the source RNC.

The hard handover procedure is used to move the URAN-CORE NETWORK connection point at RAN side from one RNC to another in such cases when Iur cannot—or is not wanted to—be used between the source and target RNCs. In a hard handover procedure, the MS is involved, and the MS determines the execution time for the hard handover procedure by making an access to the new radio resources.

The hard handover procedure is also initiated by a SRNC. The procedure is initiated by sending a RANMAP (Radio Access Network Mobile Application Part) "RELOCATION REQUIRED". The "RELOCATION REQUIRED" message generally contains a target RNC identity, a relocation/hard handover indicator, and a URAN information field. The URAN information field is a transparent field for the CN that is to be forwarded to the target RNC. The relocation/hard handover indicator indicates whether to initiate a SRNC relocation or a hard handover procedure.

When a "RELOCATION REQUIRED" message is received at a network entity, e.g. MSC or SGSN, part of RANMAP activities are suspended. Having suspended RANMAP, the MSC or SGSN sends a "RELOCATION REQUEST" message to a target RNC. The "RELOCATION REQUEST" message generally contains a URAN information field, a relocation/hard handover indicator, and binding identifiers for Iu links to be established.

Then, the SRNC performs admission control procedures for the new MS in which the serving RNC establishes all necessary protocol entities and sets the established protocol entities into initial states. Next, the SRNC prepares for switching all the Iu-links connections from the old Iur to the new intra RNC connection. The SRNC also allocates radio resources for the new MS. The SRNC then packs this radio resource information into a new RAN information field to be transmitted to the source RNC via the MSC or SGSN. When all intra RNC procedures are executed and when the new Iu-links are established by the MSC or SGSN, the SRNC acknowledges its readiness for the hard handover by sending a "RELOCATION PROCEEDING" message to the MSC or SGSN. The "RELOCATION PROCEEDING" message indicates to the MSC or SGSN the required switching mode for each Iu-link.

After reception of the "RELOCATION PROCEEDING" message, the MSC or SGSN checks from the received message which Iu-links should be connected to a data duplication mode. Then, the MSC or SGSN establishes multipoint to point connections for all uplink Iu-links by connecting corresponding old and new Iu links into the same link entity. Similarly, the MSC or SGSN starts duplicating the data from old Iu-links to the corresponding new links. When all indicated Iu-links are connected, the MSC or SGSN sends a "RELOCATION PROCEEDING" message to the target RNC and a "HANDOVER COMMAND" message to the source RNC. The "HANDOVER COMMAND" message contains the RAN Information Field produced by the target RNC.

When the source RNC receives the "HANDOVER COMMAND" message, the source RNC sends corresponding information to the MS, which makes the handover accessible to the new RNC.

When the target RNC detects the MS accessible to the allocated resource, the target RNC immediately starts to act as a SRNC. At that time point, the SRNC starts downlink data transmission to the BSs and all UL links are switched from the Iur to the new corresponding Iu-links. After completion of all relocation procedures, the SRNC completes the procedure by sending a "RELOCATION COMPLETE" message to the MSC or SGSN. p When MSC or SGSN receives the "RELOCATION COMPLETE" message, the MSC or SGSN executes Iu-link release procedures for the old Iu-links, which in turn causes execution of releasing of the corresponding Iur connections by the source RNC.

Resource release procedure may generally be required because of a SRNC relocation being completed on another RNC. The resources at the old RNC can be released by the MSC or SGSN by using a commonly adopted resource releasing procedure which is not discussed in details herewith. It is appreciated that any suitable resource releasing procedure can be adopted without departure from the principles of the present invention.

Figure 8:
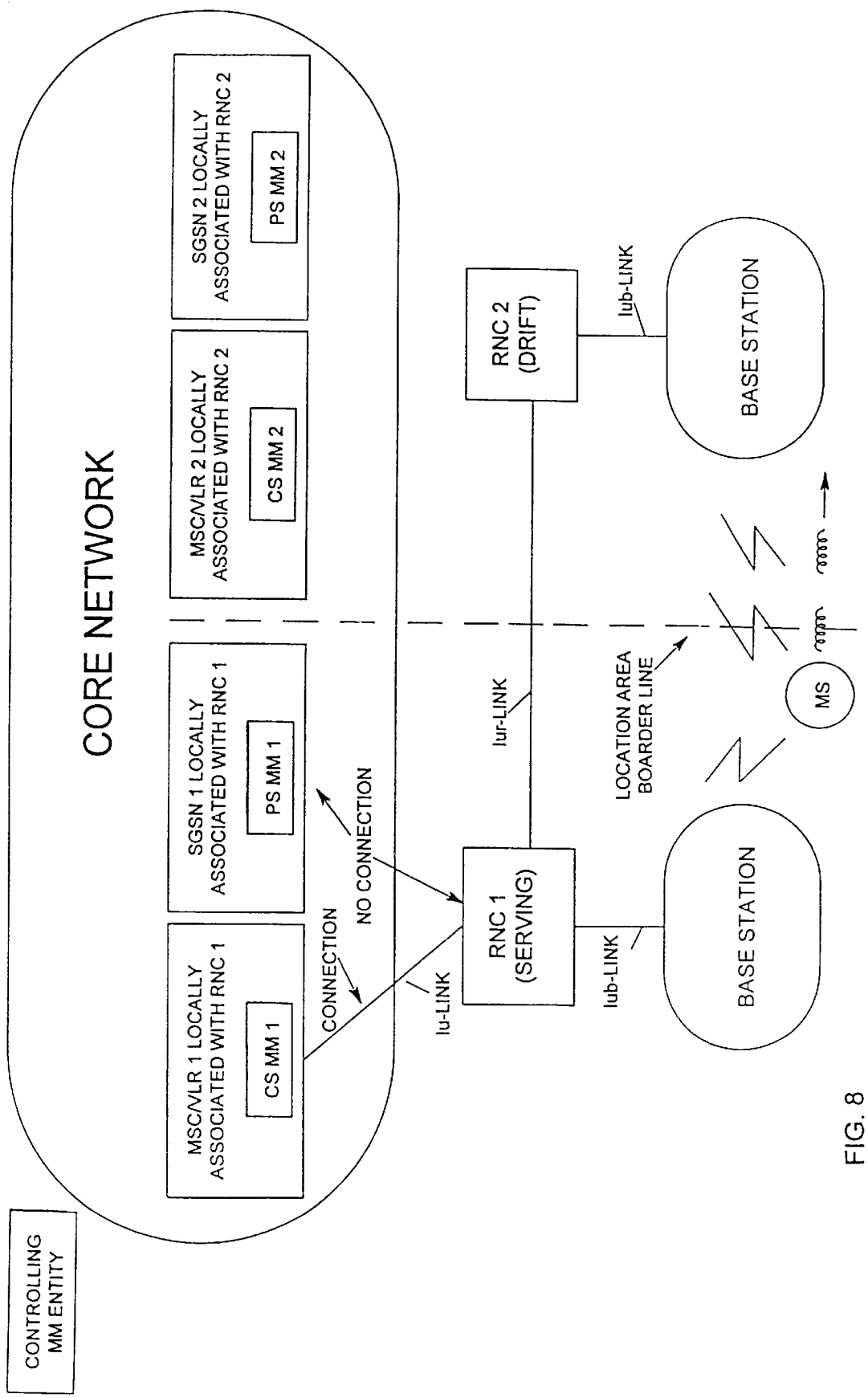
FIG. 8 illustrates a Mobile Station (MS) having at least one CS connection connected to a MSC/VLR before the MS moves into a second area in a $3^{rd}$ generation cellular system in accordance with the principles of the present invention.

FIG. 8 illustrates a Mobile Station (MS) having at least one CS connection connected to a MSC/VLR before the MS moves into a second area in a $3^{rd}$ generation cellular system in accordance with the principles of the present invention. The Iu-link is the interface between a RNC and a Core Network entity. The Iur-link is the interface between two RNCs. The Iub-link is the interface between a RNC and a BS. FIG. 8 also illustrates that a SRNC is actively connected to a Core Network entity, a MSC/VLR. In this case, the MS has a CS connection.

Figure 9:
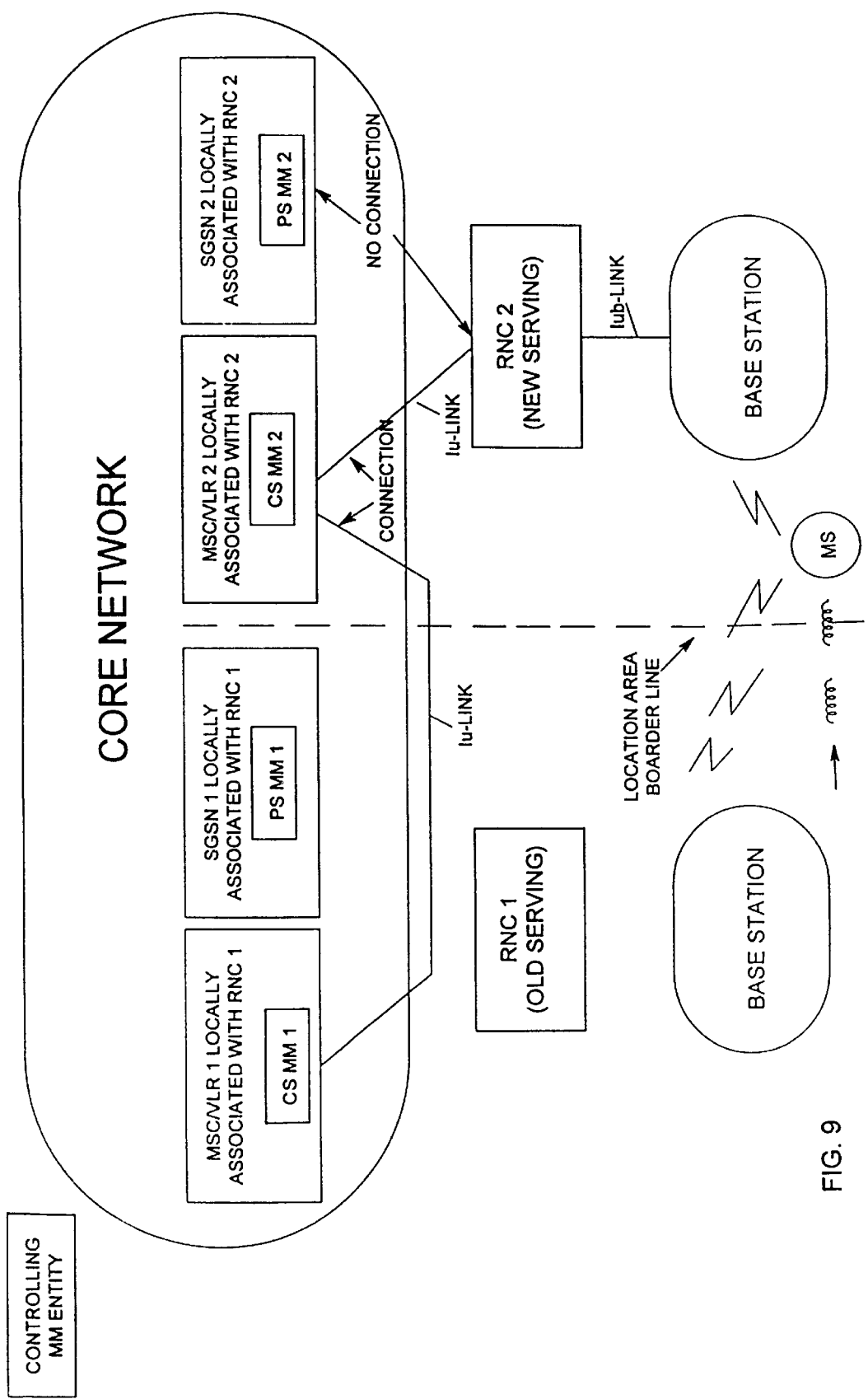
FIG. 9 illustrates a MS having at least one CS connection connected to a MSC/VLR after the MS moves into a second area in a $3^{rd}$ generation cellular system in accordance with the principles of the present invention.

FIG. 9 illustrates a MS having at least one CS connection connected to a MSC/VLR after the MS moves into a second area in a $3^{rd}$ generation cellular system in accordance with the principles of the present invention. Since the control within the MSC/VLR is generally anchored after the relocation of the SRNC, the control still remains in the MSC/VLR 1 as shown in FIG. 9. This is also the reason why MSC 1 triggers the location update of the MS in the network as shown in box 504 in FIG. 5. On the other hand, MSC/VLR 1 can update the location of the MS to a new idle CN entity, such as SGSN via MSC/SGSN interface. In this case, after the update, PS MM 2 is the controlling MM entity as shown in FIG. 9.

Figure 10:
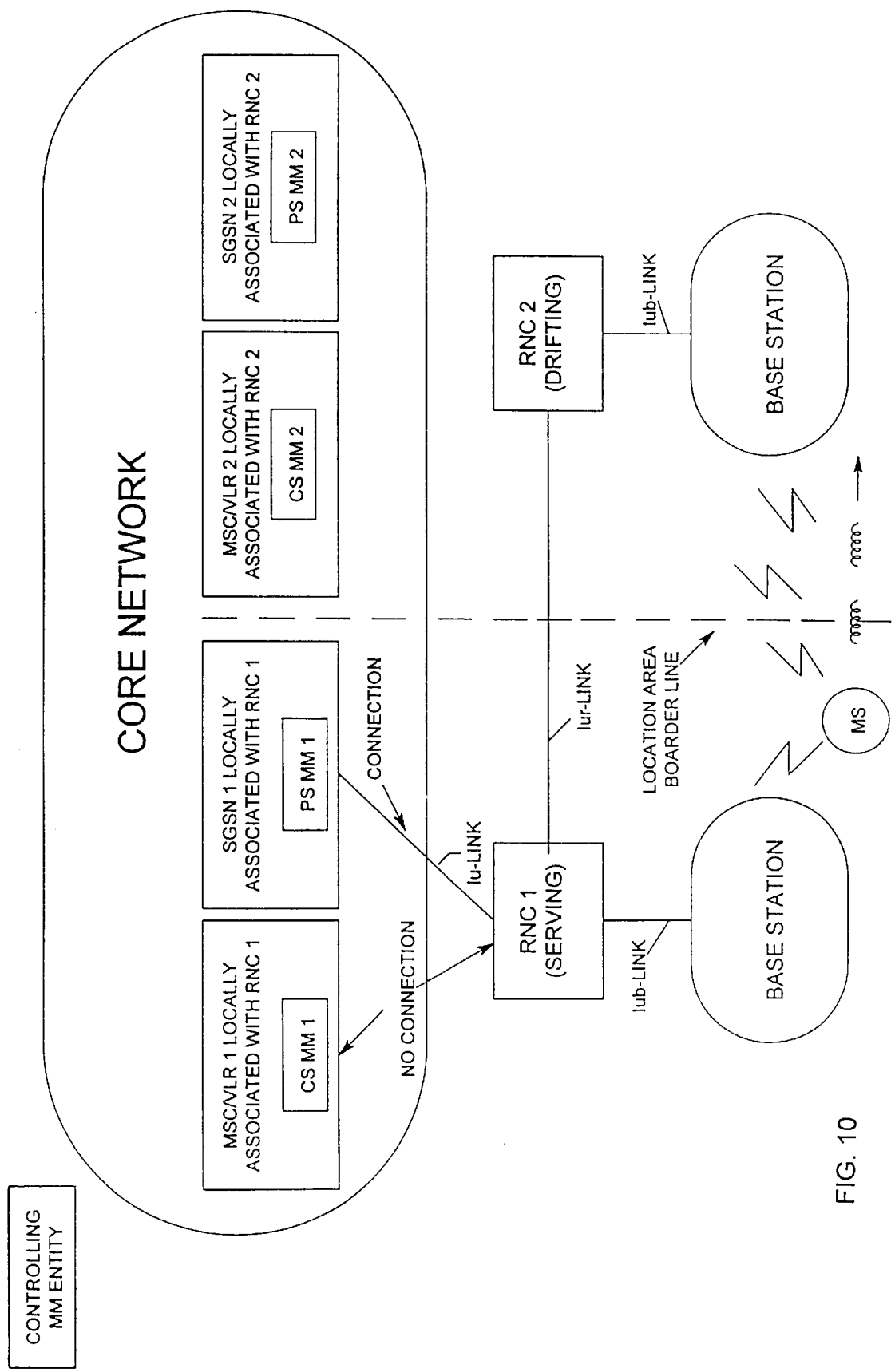
FIG. 10 illustrates a MS having at least one PS connection connected to a SGSN before the MS moves into a second area in a $3^{rd}$ generation cellular system in accordance with the principles of the present invention.

FIG. 10 illustrates a MS having at least one PS connection connected to a SGSN before the MS moves into a second area in a $3^{rd}$ generation cellular system in accordance with the principles of the present invention. A SRNC is actively connected to a Core Network entity, a SGSN. In this case, the MS has a PS connection.

Figure 11:
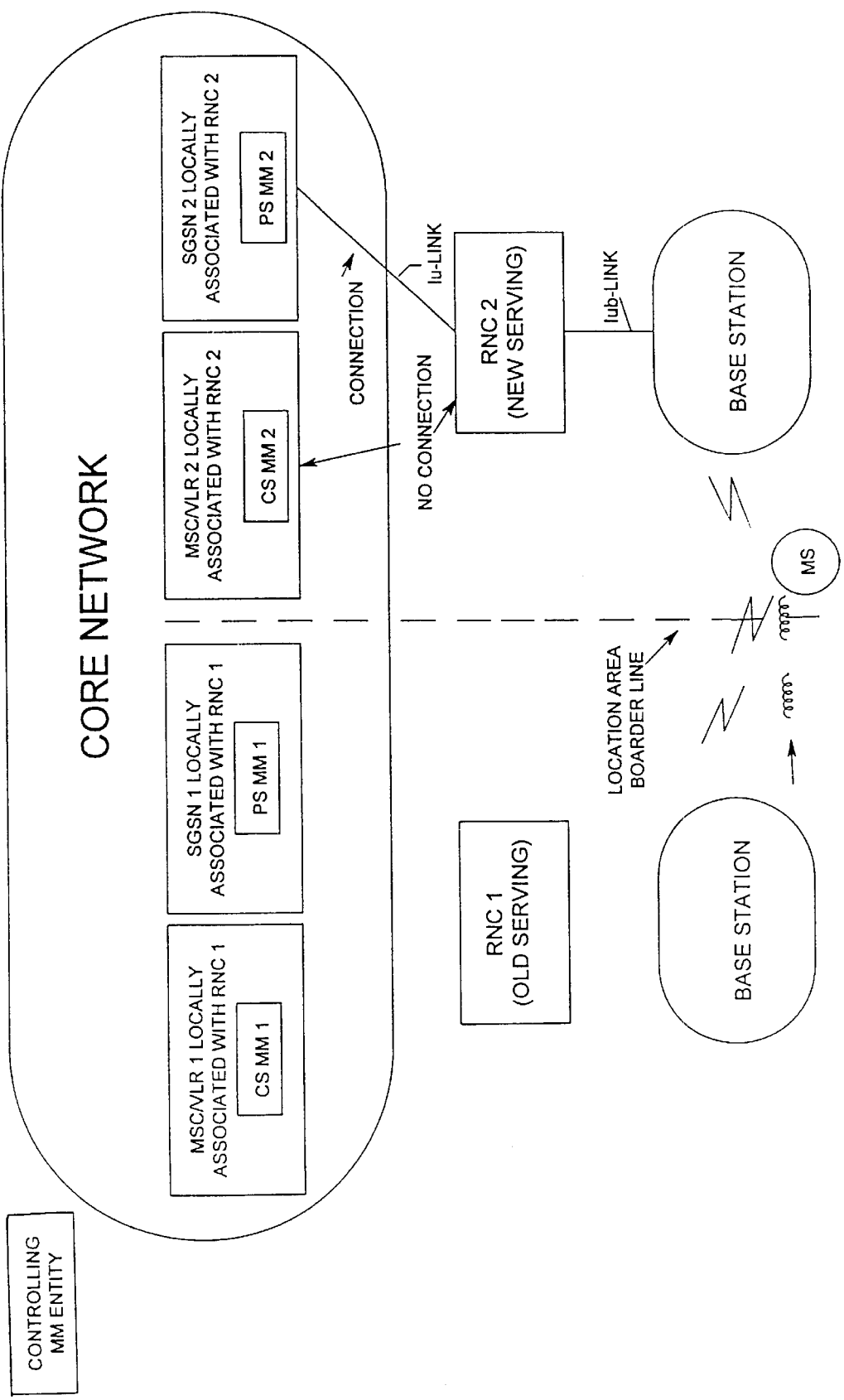
FIG. 11 illustrates a MS having at least one PS connection connected to a SGSN after the MS moves into a second area in a $3^{rd}$ generation cellular system in accordance with the principles of the present invention.

FIG. 11 illustrates a MS having at least one PS connection connected to a SGSN after the MS moves into a second area in a $3^{rd}$ generation cellular system in accordance with the principles of the present invention. The control within the SGSN is generally floating after the relocation of the SRNC, the control still moves in SGSN 2 along the move of the MS as shown in FIG. 9. It is appreciated that the control within the SGSN can be anchoring as well after the relocation of the SRNC, i.e. the control remains in the SGSN 1, similar to those shown in FIG. 9 which is not repeated. In a floating situation, SGSN 2 can trigger the location update of the MS in the network as shown in box 516 in FIG. 5. On the other hand, SGSN 2 can update the location of the MS to a new idle CN entity, such as MSC/VLR, via SGSN/MSC interface. In this case, after the update, CS MM 2 is the controlling MM entity as shown in FIG. 11.

Figure 12:
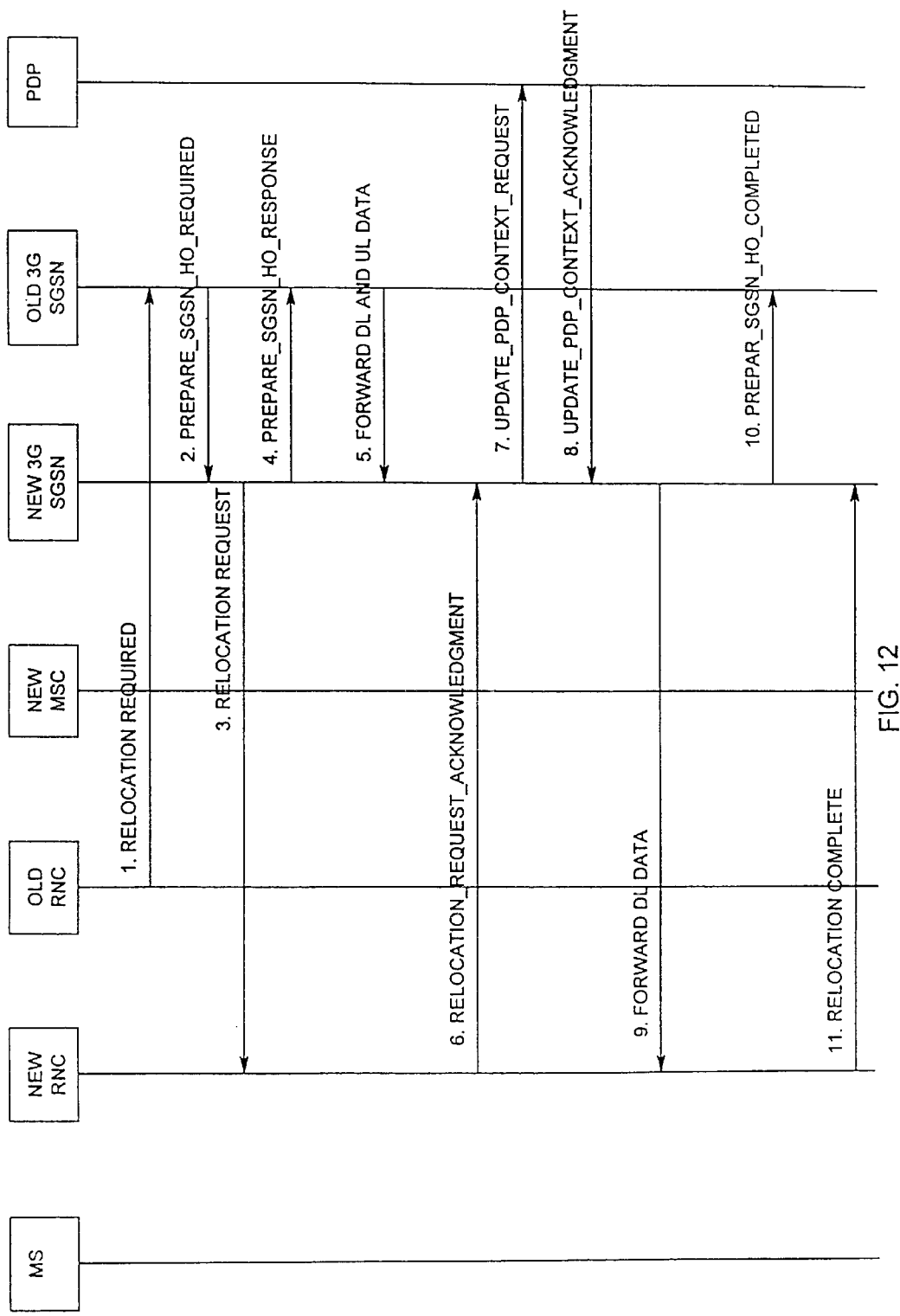
FIG. 12 illustrates an inter-SGSN handover from a 3G SGSN to a 3G SGSN in a $3^{rd}$ generation cellular system in accordance with the principles of the present invention.

The present invention also provides an inter CN entity handover, such as inter-SGSN handover, whereby one of the SGSNs is a 2G SGSN or 3G SGSN, and the other one of the SGSNs is a 2G SGSN or 3G SGSN. This is accomplished by firstly determining whether both of the SGSNs are 2G SGSN or 3G SGSN or whether one is 2G SGSN and the other is 3G SGSN, and secondly operating the corresponding inter-SGSN handover. FIG. 12 illustrates an inter-SGSN handover from a 3G SGSN to a 3G SGSN in a $3^{rd}$ generation cellular system in accordance with the principles of the present invention. The inter-SGSN handover procedure between 3G-3G is generally described as follows:

1. If a SRNC relocation is requested, sending a "Relocation Required" message to the corresponding old network entity, e.g. old 3G SGSN.

2. The old 3G SGSN determines that a new RNC is under a new 3G SGSN, and thus sends a "PREPARE_GSN_HO_REQUIRED" message to a new 3G SGSN. This message includes all information about Iu-links, URAN, and old 3G SGSN which are to be established into the new 3G SGSN and the new RNC.

3. The new 3G SGSN sends the URAN information to the new RNC with a "RELOCATION REQUEST" message.

4. The new 3G SGSN sends an acknowledgment to the old 3G SGSN.

5. The old 3G SGSN forwards Downlink (DL) and Uplink (UL) data to the new 3G SGSN.

6. The new 3G RNC informs the new 3G SGSN that the new RNC is ready to receive data from the new 3G SGSN.

7. The new 3G SGSN updates the contexts of Packet Data Protocol (PDP).

8. The Packet Data Gateway (PDG) or Gateway GPRS Support Node (GGSN) of the PDP sends an acknowledgment to the new 3G SGSN.

9. The new 3G SGSN sends the DL data to the new RNC.

10. The new 3G SGSN sends a "PREPARE_SGSN_HO_COMPLETE" message to the old 3G SGSN. When the old 3G SGSN receives the complete message, the old 3G SGSN clears all data belonging to the MS.

11. The new RNC detects the DL data, switches UL data, and sends a "RELOCATION COMPLETE" message to the new 3G SGSN.

Figure 18:
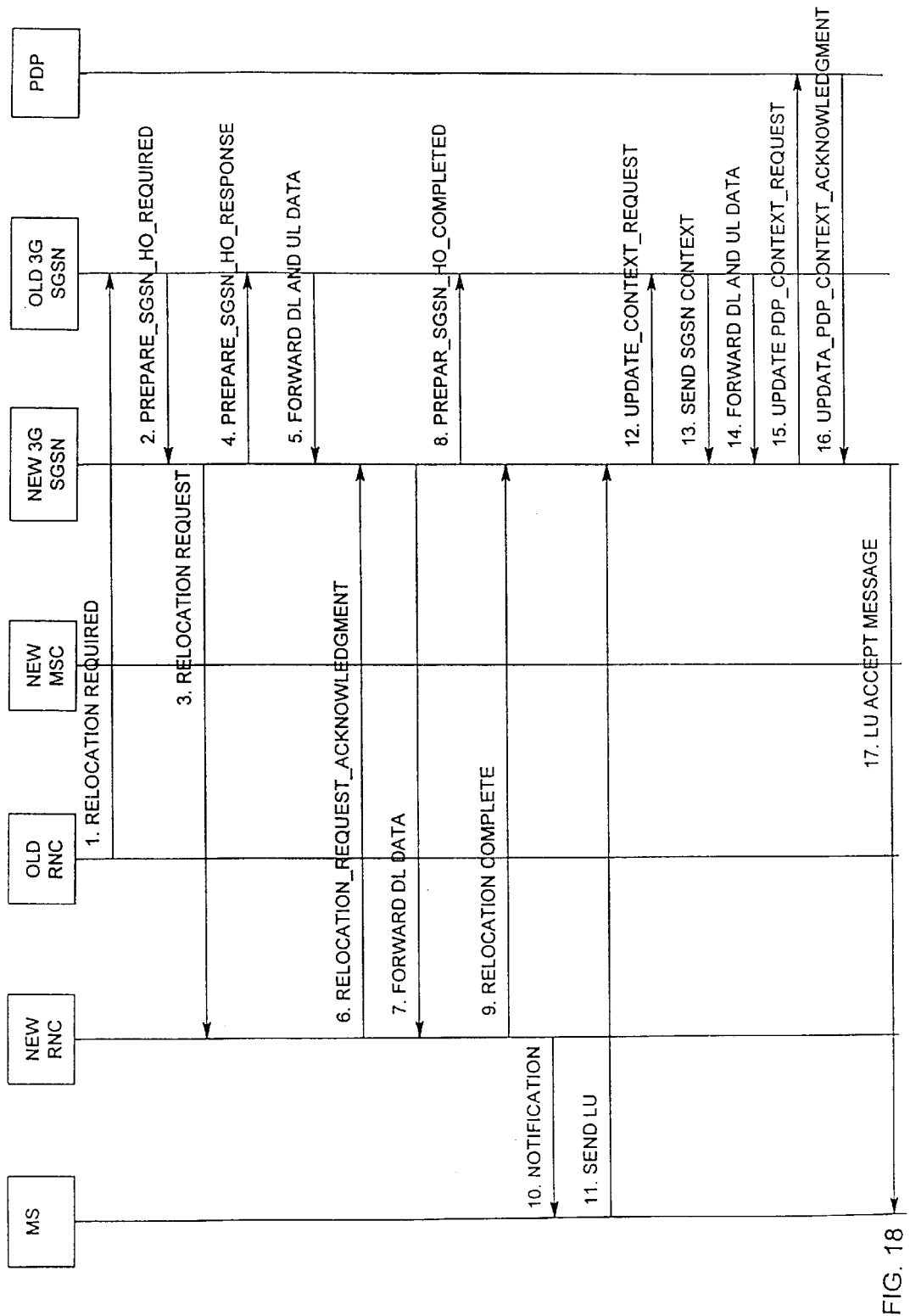
FIG. 18 illustrates an alternative inter-SGSN handover from a 3G SGSN to a 3G SGSN in a $3^{rd}$ generation cellular system in accordance with the principle of the present invention.

FIG. 18 illustrates an alternative inter-SGSN handover from a 3G SGSN to a 3G SGSN in a $3^{rd}$ generation cellular system in accordance with the principles of the present invention. The alternative inter-SGSN handover procedure between 3G-3G is generally described as follows:

1. If a SRNC relocation is requested, sending a "Relocation Required" message to the corresponding old network entity, e.g. old 3G SGSN.

2. The old 3G SGSN determines that a new RNC is under a new 3G SGSN, and thus sends a "PREPARE_SGSN_HO_REQUIRED" message to a new 3G SGSN. This message includes all information about Iu-links, URAN, and old 3G SGSN which are to be established into the new 3G SGSN and the new RNC.

3. The new 3G SGSN sends the URAN information to the new RNC with a "RELOCATION REQUEST" message.

4. The new 3G SGSN sends an acknowledgment to the old 3G SGSN.

5. The old 3G SGSN forwards Downlink (DL) and Uplink (UL) data to the new 3G SGSN.

6. The new 3G RNC informs the new 3G SGSN that the new RNC is ready to receive data from the new 3G SGSN.

7. The new 3G SGSN sends the DL data to the new RNC.

8. The new 3G SGSN sends a "PREPARE_SGSN_HO_COMPLETE" message to the old 3G SGSN. When the old 3G SGSN receives the complete message, the old 3G SGSN clears all data belonging to the MS.

9. The new RNC detects the DL data, switches UL data, and sends a "RELOCATION COMPLETE" message to the new 3G SGSN.

10. The MS receives notification that it needs to perform Location Update(LU) to the new 3G SGSN.

11. The MS sends the LU to the new 3G SGSN.

12. The new 3G SGSN updates the SGSN contexts from the old 3G SGSN.

13. The old 3G SGSN sends SGSN contexts to the new 3G SGSN.

14. The old 3G SGSN forwards data to the new 3G SGSN.

15. The new 3G SGSN updates PDP contexts.

16. The PDG or GGSN of the PDP sends an acknowledgment to the new 3G SGSN.

17. The new 3G SGSN sends a "LU_ACCEPT" message to the MS.

Referring back to FIG. 5, if the SRNC relocation is used as described in FIG. 18, then an update will be sent to the new SGSN by the MS after the Box 518. If the SRNC relocation is used as described in FIG. 12, then no LU is sent to the new SGSN by the MS after the Box 518. In addition, in the case of FIG. 18, an update is sent to the new SGSN after the Box 522.

It is appreciated that many other suitable implementation can be used within the principles of the present invention generally shown in the above steps as one of the implementations. It is also appreciated that the sequence order of the above procedure can be varied in different implementations.

Figure 13:
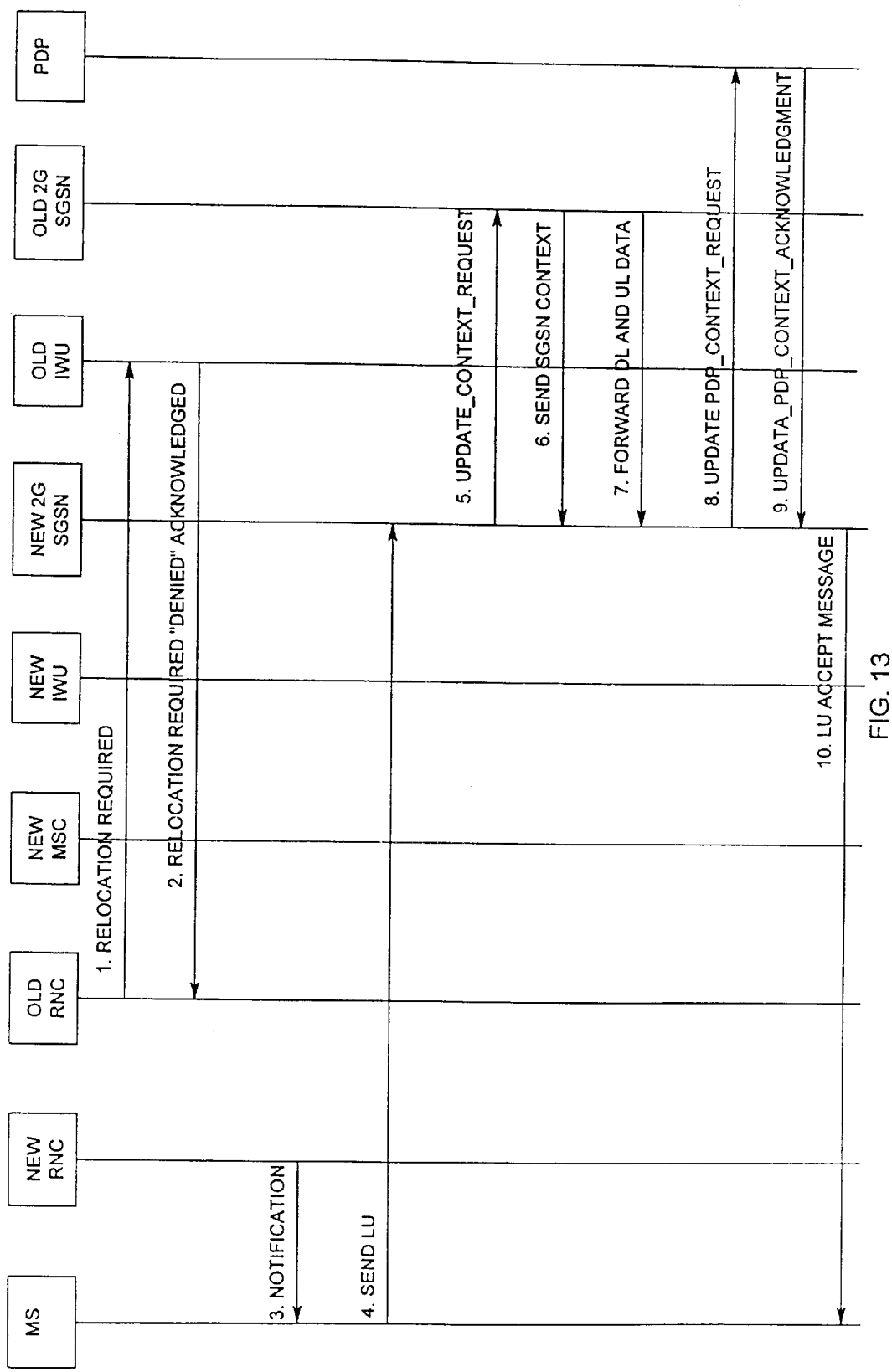
FIG. 13 illustrates an inter-SGSN handover from a 2G SGSN to a 2G SGSN in a $3^{rd}$ generation cellular system in accordance with the principles of the present invention.

FIG. 13 illustrates an inter-SGSN handover from a 2G SGSN to a 2G SGSN in a $3^{rd}$ generation cellular system in accordance with the principles of the present invention. The inter-SGSN handover procedure between 2G-2G is generally described as follows:

1. If a SRNC relocation is requested, sending a "Relocation Required" message to the corresponding Interworking Unit (old IWU).

2. The old IWu sends a "not" or "denial" acknowledgment message back to the SRNC with a cause that the CN entity is 2G SGSN. The SRNC releases all connection from the old RNC that belongs to the corresponding old 2G SGSN.

3. If the MS has simultaneous connections from MSC/VLR, the MS waits that the new RNC or MSC/VLR notifies the MS that it needs to perform Location Update (LU) to the new 2G SGSN.

4. The MS sends the LU to the new 2G SGSN.

5. The new 2G SGSN updates the SGSN contexts from the old 2G SGSN.

6. The old 2G SGSN sends SGSN contexts to the new 2G SGSN.

7. The old 2G SGSN forwards data to the new 2G SGSN.

8. The new 2G SGSN updates PDP contexts.

9. The PDG or GGSN of the PDP sends an acknowledgment to the new 2G SGSN.

10. The new 2G SGSN sends a "LU_ACCEPT" message to the MS.

It is appreciated that many other suitable implementation can be used within the principles of the present invention generally shown in the above steps as one of the implementations. It is also appreciated that the sequence order of the above procedure can be varied in different implementations.

Figure 14:
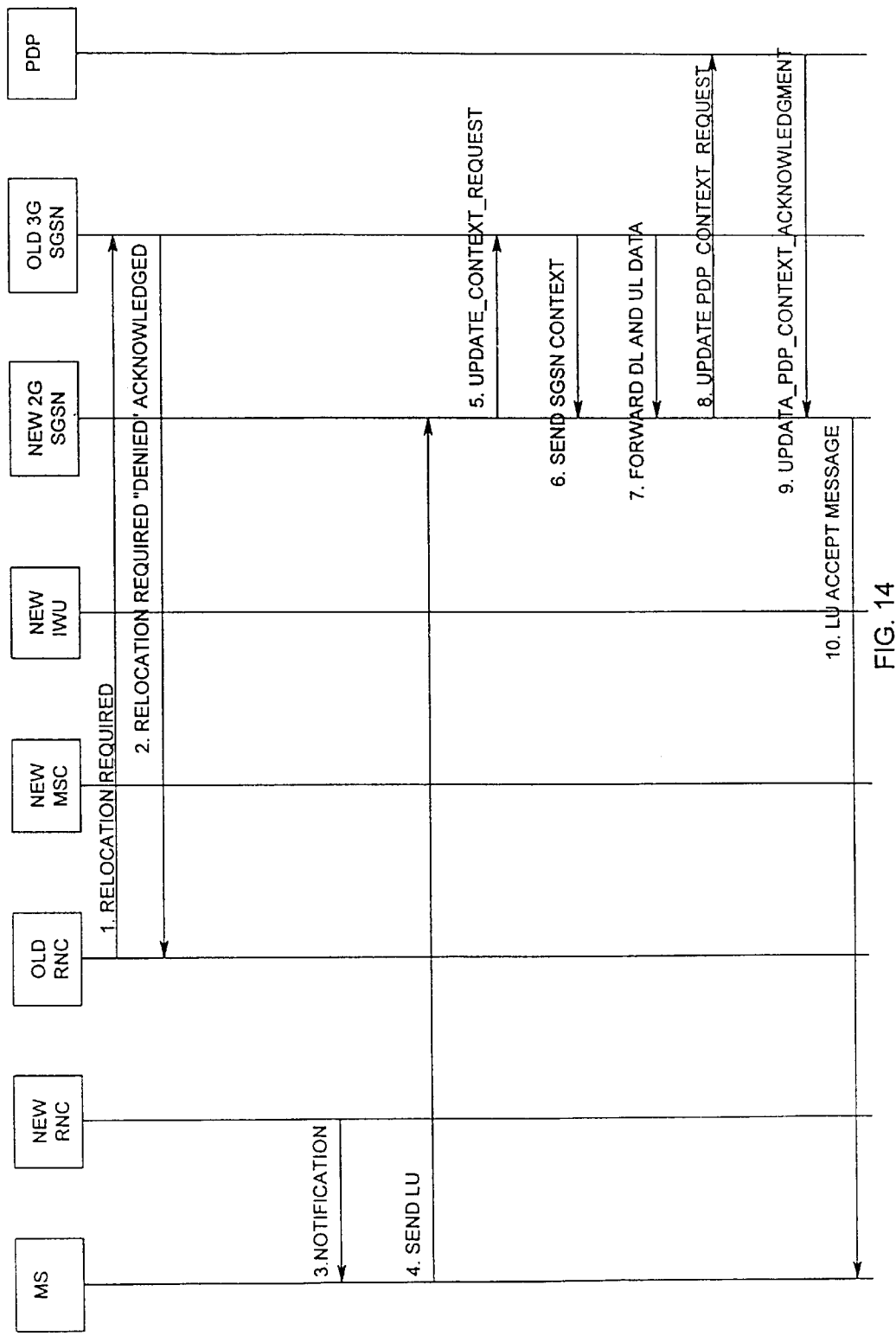
FIG. 14 illustrates an inter-SGSN handover from a 3G SGSN to a 2G SGSN in a $3^{rd}$ generation cellular system in accordance with the principles of the present invention.

FIG. 14 illustrates an inter-SGSN handover from a 3G SGSN to a 2G SGSN in a $3^{rd}$ generation cellular system in accordance with the principles of the present invention. The inter-SGSN handover procedure between 3G-2G is generally described as follows:

1. If a SRNC relocation is requested, sending a "Relocation Required" message to corresponding old network entity, e.g. old 3G SGSN.

2. The old SGSN determines that a new RNC is under a new 2G SGSN, and thus sends a "not" or "denial" acknowledgment message to a new 2G SGSN. This message includes all information about Iu-links, URAN, and old 3G SGSN which are to be established into the new 2G SGSN and the new RNC.

3. If the MS has simultaneous connections from MSC/VLR, the MS waits that the new RNC or MSC/VLR notifies the MS that it needs to perform Location Update (LU) to the new 2G SGSN.

4. The MS sends the LU to the new 2G SGSN.

5. The new 2G SGSN updates the SGSN contexts from the old 3G SGSN.

6. The old 3G SGSN sends SGSN contexts to the new 2G SGSN.

7. The old 3G SGSN forwards data to the new 2G SGSN.

8. The new 2G SGSN updates PDP contexts.

9. The PDG or GGSN of the PDP sends an acknowledgment to the new 2G SGSN.

10. The new 2G SGSN sends a "LU_ACCEPT" message to the MS.

It is appreciated that many other suitable implementation can be used within the principles of the present invention generally shown in the above steps as one of the implementations. It is also appreciated that the sequence order of the above procedure can be varied in different implementations.

Figure 15:
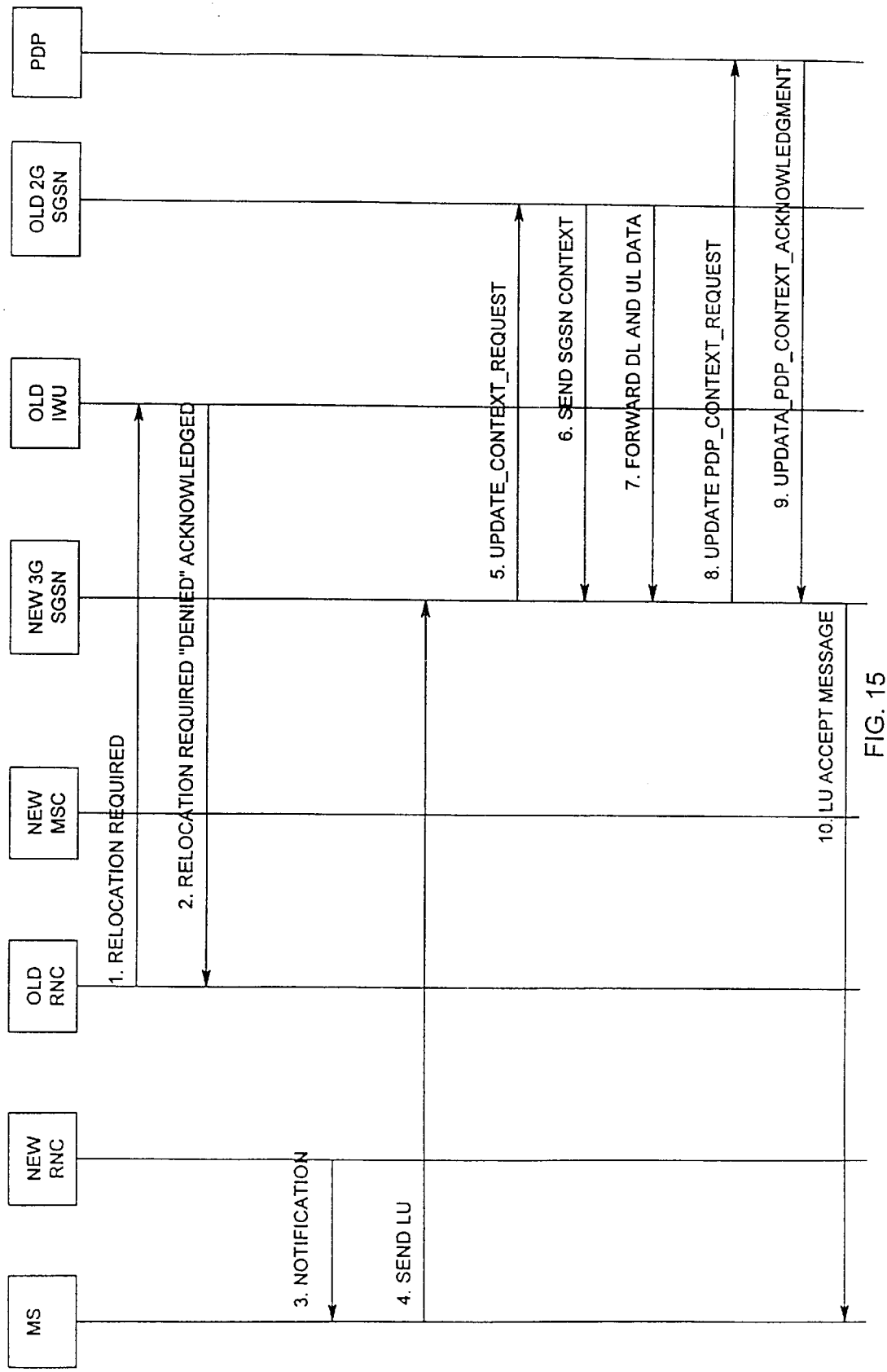
FIG. 15 illustrates an inter-SGSN handover from a 2G SGSN to a 3G SGSN in a $3^{rd}$ generation cellular system in accordance with the principles of the present invention.

FIG. 15 illustrates an inter-SGSN handover from a 2G SGSN to a 3G SGSN in a $3^{rd}$ generation cellular system in accordance with the principles of the present invention. The inter-SGSN handover procedure between 2G-3G is generally described as follows:

1. If a SRNC relocation is requested, sending a "Relocation Required" message to the corresponding Interworking Unit (old IWU).

2. The old IWU sends a "not" or "denial" acknowledgment message back to the SRNC with a cause that the CN entity is 2G SGSN. The SRNC releases all connection from the old RNC that belongs to the corresponding old 2G SGSN.

3. If the MS has simultaneous connections from MSC/VLR, the MS waits that the new RNC or MSC/VLR notifies the MS that it needs to perform Location Update (LU) to the new 3G SGSN.

4. The MS sends the LU to the new 3G SGSN.

5. The new 3G SGSN updates the SGSN contexts from the old 2G SGSN.

6. The old 2G SGSN sends SGSN contexts to the new 3G SGSN.

7. The old 2G SGSN forwards data to the new 3G SGSN.

8. The new 3G SGSN updates PDP contexts.

9. The PDG or GGSN of the PDP sends an acknowledgment to the new 3G SGSN.

10. The new 3G SGSN sends a "LU_ACCEPT" message to the MS.

It is appreciated that many other suitable implementation can be used within the principles of the present invention generally shown in the above steps as one of the implementations.

It is also appreciated that the sequence order of the above procedure can be varied in different implementations.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a notification to a Mobile Station (MS) for a location update of the MS in a mobile telecommunication system wherein the MS is controlled by one of a plurality of Radio Network Controllers (RNCs), which comprising:
   a) serving the MS by a first RNC;
   b) in response to the MS having moved from a first area to a second area, wherein service in the first area is provided via a first set of Base Stations (BSs) controlled by the first RNC and service in the second area is provided via a second set of BSs controlled by a second RNC, providing the service to the MS via the second set of BSs while keeping the control of the connection with the first RNC, and monitoring a predefined criteria set for RNC relocation;
   c) in response to having met the predefined criteria, moving the control of the connection to the second RNC, the plurality of RNCs being connected to a Core Network (CN) which has a plurality of CN entities including one active CN entity, so that control of the connection is changed from the first RNC to the second RNC; and
   d) notifying the MS that the control of the connection has been changed from the first RNC to the second RNC and that the location update of the MS should be performed.

2. The method of claim 1, wherein the active CN entity is connected to the first RNC.

3. The method of claim 1, wherein the active CN entity is connected to the second RNC.

4. The method of claim 1, further comprising sending the location update of the MS by the MS to the plurality of CN entities.

5. The method of claim 1, wherein notifying the MS is made by the MS.

6. The method of claim 1, wherein notifying the MS is made by the second RNC.

7. The method of claim 1, wherein notifying the MS is made by the active CN entity.

8. A method of mobility management in a mobile telecommunication system including a mobile station (MS), a radio network having a plurality of radio network controllers (RNCs) controlling use of radio resources and including a serving RNC, and a plurality of core network entities (CNEs) each of which connects to at least one of the RNCs, the MS having at least one type of connection connected to the CNEs, the CNEs managing mobility of the MS by storing information of a current location of the MS and connecting at least a first type of connections of the MS to a second network and a second MS of the mobile telecommunication system, a radio connection of the MS being controlled by the serving RNC, and an MS connection being routed to/from a respective CNE via the serving RNC, the method comprising:
   controlling the mobile station (MS) by a first RNC of the plurality of RNCs, the first RNC being the serving RNC;
   in response to the MS having moved from a first area to a second area wherein service in the first area is provided via a first set of Base Stations (BSs) controlled by the first RNC and service in the second area is provided via a second set of BSs controlled by a second RNC, providing the service to the MS from the second set of BSs while keeping control of the MS connection with the first RNC, and monitoring a predefined criteria set for RNC relocation;
   in response to having met the predefined criteria, moving the control of the MS connection to the second RNC according to a predefined criteria, service in the second area being controlled by the second RNC when the MS is moved from the first area to the second area, the second RNC being the serving RNC; and
   updating location of the MS to the CNE connected to the second RNC to manage mobility of the MS.

9. A method according to claim 8, wherein the updating step comprises the steps of notifying the MS that the control of the radio connection of the MS has been moved to the second RNC, the MS sending a location update upon receiving notification.

10. A method according to claim 8, wherein the MS is notified that the control of the radio connection of the MS is moved to the second RNC by the second RNC.

11. A method according to claim 8, wherein the MS is notified that the control of the radio connection of the MS is moved to the second RNC by one of the CNEs.

12. A method according to claim 8, wherein location of the MS is updated to the CNE connected to the second RNC by the second RNC.

13. A method according to claim 8, wherein the mobile telecommunication system comprising at least two different types of CNEs, the location of the MS is updated to a second type of the CNE connected to the second RNC by a first type of the CNE controlling the first type connection of the MS.

14. A method according to claim 8, wherein the first RNC is connected to a first one of the CNEs, the second RNC is connected to a second one of the CNEs, when the location of the MS is updated to the second CNE, the control of the connection is moved from the first CNE to the second CNE.

15. A method according to claim 8, wherein the first RNC is connected to a first one of the CNEs, and the second RNC is connected to a second one of the CNEs, when the location of the MS is updated to the second CNE, the control of connection remains in the first CNE.

16. A method according to claim 8, wherein the mobile telecommunication system comprises at least two different types of CNEs, the MS has an active connection to a first type of the CNE which is connected to a first RNC and has no active connection to a second type of the CNE which is connected to the first RNC, the location of the MS is updated to the second type of the CNE connected to the second RNC.

17. A method according to claim 8, wherein the mobile telecommunication system has at least two different types of CNEs, wherein the location of the mobile station is updated in at least two types of CNEs connected to the second RNC.

18. A radio access network for a mobile telecommunication system, comprising:
   a mobile station (MS);
   a radio access network including a plurality of radio network controllers (RNCs) controlling use of radio resources;
   a plurality of core network elements (CNEs) each connected to at least one of the RNCs, the MS having at least one controlling CNE that manages mobility of the MS by storing information on a current location of the MS and connects at least a first type of connections of the MS to other networks and other mobile stations of the mobile telecommunication system, a radio connection of the MS being controlled by a serving RNC and serviced by a first set of Base Stations (BSs) and the connection of the MS being routed to/from a respective CNE via the serving RNC, and in response to the MS moving to an area serviced by a second set of Base Stations (BSs) controlled by a second RNC, control of the connection of the MS being kept with the serving RNC while service being transferred to the second set of BSs, and a predefined criteria set for moving the control to the second RNC being monitored, and the serving RNC functionality of the connection being moved from the serving RNC to the second RNC in response to meeting the predefined criteria; and wherein the radio access network is arranged to update the current location of the MS to the CNE connected to the second RNC to manage mobility of the MS in response to having moved the control of the radio connection of the MS from the first RNC to the second RNC.

19. A radio access controller for a mobile telecommunication system, comprising:

a mobile station (MS);

a radio access network including a plurality of radio network controllers (RNCs) controlling use of radio resources;

a plurality of core network elements (CNEs) each connected to at least one RNC, the MS having at least one controlling CNE that manages mobility of the MS by storing information on a current location of the MS and connects at least a first type of connections of the MS to other networks and other MSs of the mobile telecommunication system, a radio connection of the MS being controlled by a serving RNC and serviced by a first set of Base Stations (BSs) and the connection of the MS being routed to/from a respective CNE via the serving RNC, and in response to the MS moving to an area controlled by a second RNC and serviced by a second set of BSs, control of the connection of the MS being kept with the serving RNC while service being transferred to the second set of BSs, and a predefined criteria set for moving the control to the second RNC being monitored, and the serving RNC functionality of the connection being moved from the serving RNC to the second RNC in response to meeting the predefined criteria; and wherein the radio access controller is arranged to update a current location of the MS to the CNE connected to the second RNC to manage mobility of the MS in response to having moved the control of the radio connection of the MS from the first RNC to the second RNC.

20. A radio access network for a mobile telecommunication system, comprising:

a mobile station (MS);

a radio access network including a plurality of radio network controllers (RNCs) controlling use of radio resources;

a plurality of core network elements (CNEs) each connected to at least one RNC, the MS having at least one controlling CNE storing information on a current location of the MS and connecting at least a first type of connections of the MS to other networks and other mobile stations of the mobile telecommunication system, a radio connection of the MS being controlled by a serving RNC and serviced by a first set of Base Stations (BSs) and the connection of the MS being routed to/from a respective CNE via the serving RNC, and in response to the MS moving to an area controlled by a second RNC and serviced by a second set of BSs, control of the connection of the MS being kept with the serving RNC while service being transferred to the second set of BSs, and a predefined criteria set for moving the control to the second RNC being monitored, and the serving RNC functionality of the connection being moved from the serving RNC to the second RNC in response to meeting the predefined criteria; and wherein the radio access network is arranged to send the MS a request to send a location update message in response to having moved the control of the radio connection of the MS from the first RNC to the second RNC.

21. A radio access controller for a mobile telecommunication system, comprising:

a mobile station (MS);

a radio access network including a plurality of radio network controllers (RNCs) controlling use of radio resources;

core network elements (CNEs) each connected to at least one RNC, the MS having at least one controlling CNE storing information on a current location of the MS and connecting at least a first type of connections of the MS to other networks and other mobile stations of the mobile telecommunication system, a radio connection of the MS being controlled by a serving RNC and serviced by a first set of Base Stations (BSs) and the connection of the MS being routed to/from a respective CNE via the serving RNC, and in response to the MS moving to an area controlled by a second RNC and serviced by a second set of BSs, control of the connection of the MS being kept with the serving RNC while service being transferred to the second set of BSs, and a predefined criteria set for moving the control to the second RNC being monitored, and the serving RNC functionality of the connection being moved from the serving RNC to the second RNC in response to meeting the predefined criteria; and wherein the radio network controller is arranged to send the MS a request to send a location update message in response to having moved the control of the radio connection of the MS from the first RNC to the second RNC.

* * * * *